US012760871B2

(12) United States Patent
McMillan

(10) Patent No.: US 12,760,871 B2
(45) Date of Patent: Oct. 13, 2026

(54) LIGHTING FIXTURE ASSEMBLY

(71) Applicant: Alamo Lights LLC, Liberty Hill, TX (US)

(72) Inventor: Timothy McMillan, Liberty Hill, TX (US)

(73) Assignee: Alamo Lights LLC, Liberty Hill, TX (US)

( * ) Notice: Subject to any disclaimer, the term of this patent is extended or adjusted under 35 U.S.C. 154(b) by 0 days.

(21) Appl. No.: 18/979,106

(22) Filed: Dec. 12, 2024

(65) Prior Publication Data

US 2025/0198603 A1 Jun. 19, 2025

Related U.S. Application Data

(60) Provisional application No. 63/610,787, filed on Dec. 15, 2023.

(51) Int. Cl.

| | |
|---|---|
| ***F21V 19/00*** | (2006.01) |
| ***F21V 15/01*** | (2006.01) |
| ***F21V 17/00*** | (2006.01) |
| ***F21V 17/18*** | (2006.01) |
| ***F21V 21/03*** | (2006.01) |
| ***F21Y 115/10*** | (2016.01) |

(52) U.S. Cl.

CPC .......... *F21V 19/0085* (2013.01); *F21V 15/01* (2013.01); *F21V 17/007* (2013.01); *F21V 17/18* (2013.01); *F21V 21/03* (2013.01); *F21Y 2115/10* (2016.08)

(58) Field of Classification Search

CPC .. F21V 19/00085; F21V 15/01; F21V 15/013; F21V 17/18; F21V 17/007; F21V 21/03; F21V 27/02; F21V 19/0085; F21V 19/009; F21K 9/272; F21K 9/275; F21S 4/28; F21Y 2103/00; F21Y 2103/10

See application file for complete search history.

(56) References Cited

U.S. PATENT DOCUMENTS 2,958,763 A 11/1960 Marcus
4,992,915 A * 2/1991 Meister ................ F21V 19/008 362/217.08
5,381,320 A * 1/1995 Jordan ...................... F21V 3/00 362/147

(Continued)

FOREIGN PATENT DOCUMENTS

FR 1251789 A * 1/1961

*Primary Examiner* — Erin Kryukova
(74) *Attorney, Agent, or Firm* — Fish & Richardson P.C.

(57) ABSTRACT

A lighting fixture assembly includes: a top plate supporting holders for a plurality of tube lights, wherein each holder is configured to provide an electrical connection to a respective tube light of the plurality of tube lights; and a housing defining a trough that is sized to contain the plurality of tube lights, the top plate configured for releasable attachment to the housing, and the top plate and the housing enclosing the trough when the top plate is attached to the housing. The housing includes: a base plate having a base length in a first direction, the base length corresponding to the tube light length; a pair of opposing sidewalls attached to the base plate and extending along the base length; and a pair of opposing end walls attached to the base plate and each connecting the pair of sidewalls.

18 Claims, 30 Drawing Sheets

(56) References Cited

U.S. PATENT DOCUMENTS

| | | | | |
|---|---|---|---|---|
| 5,440,466 | A * | 8/1995 | Belisle | F21V 17/107 362/225 |
| 5,440,470 | A * | 8/1995 | Ly | F21V 7/005 362/217.08 |
| 5,521,804 | A | 5/1996 | Degelmann et al. | |
| 6,439,742 | B1 * | 8/2002 | Lavergne | F21V 19/008 362/217.08 |
| 6,913,372 | B2 * | 7/2005 | Allcock | F21S 8/04 362/225 |
| 7,036,955 | B2 | 5/2006 | Kazi et al. | |
| 8,109,648 | B2 | 2/2012 | Laso et al. | |
| 2003/0202347 | A1 | 10/2003 | Chelf et al. | |
| 2006/0152934 | A1 * | 7/2006 | Lavergne | F21V 19/008 362/285 |
| 2007/0253205 | A1 * | 11/2007 | Welker | F21S 8/02 362/373 |
| 2010/0208476 | A1 * | 8/2010 | Laso | F21V 17/007 362/382 |
| 2010/0232152 | A1 * | 9/2010 | Bankemper | F21S 4/20 362/217.1 |
| 2012/0002428 | A1 * | 1/2012 | Tomasi | F21V 17/007 362/382 |
| 2013/0208470 | A1 | 8/2013 | Ye et al. | |
| 2023/0265995 | A1 | 8/2023 | Beatenbough et al. | |

* cited by examiner

LIGHTING FIXTURE ASSEMBLY

CROSS-REFERENCE TO RELATED APPLICATION

This application claims the benefit of U.S. Provisional Application No. 63/610,787, filed Dec. 15, 2023, the contents of which are incorporated by reference herein.

TECHNICAL FIELD

This specification relates generally to lighting fixtures, and more specifically to strip lighting fixtures.

BACKGROUND

This specification relates to strip lighting fixtures. Strip lighting fixtures can be used to hold and illuminate lighting technologies such as incandescent tube lights, fluorescent tubes, and halogen lamps. These lighting technologies may suffer from limitations such as high energy consumption, limited lifespan, limited control over lighting parameters, and toxic chemicals that can be released with broken lamps. Additionally, fluorescent lights use fluorescent ballast to regulate electrical current and voltage.

Unlike fluorescent lamps, light-emitting diode (LED) technology does not require an external ballast device for stable operation. LED light bulbs offer additional advantages over other lighting technologies, including lower energy consumption, longer lifespan, higher color quality, lower flicker, greater flexibility in terms of color temperature and intensity control, and no toxic chemicals. LED lights can be in the form of tube lights. Lighting fixtures for holding and energizing tube lights can be installed on structures such as ceilings.

SUMMARY

Disclosed are lighting fixture assemblies for LED light bulbs, such as LED light bulbs in the form of tube lights. A lighting fixture assembly can be configured to hold the tube lights with holders that include light sockets. During operation, the tube lights can be energized through the sockets. The lighting fixture assembly can be configured to contain the tube lights in a housing of the lighting fixture assembly when the lighting fixture assembly is not in operation. For example, the tube lights can be inserted into the housing in preparation for storing or shipping the lighting fixture assembly. The tube lights can be inserted into the housing and removed from the housing without disassembling the lighting fixture assembly. The tube lights can be inserted into the housing and removed from the housing without removing any components of the lighting fixture assembly. The tube lights can be inserted into the housing and removed from the housing by hand, without the use of a tool. The housing provides protection to the tube lights during storing and shipping. Multiple lighting fixtures can be stacked, stored, and shipped with the tube lights contained in the respective housings.

In general, one innovative aspect of the subject matter described in this specification can be embodied in a lighting fixture assembly, including: a top plate supporting holders for a plurality of tube lights, where each holder is configured to provide an electrical connection to a respective tube light of the plurality of tube lights; and a housing defining a trough that is sized to contain the plurality of tube lights, the top plate configured for releasable attachment to the housing, and the top plate and the housing enclosing the trough when the top plate is attached to the housing.

The foregoing and other embodiments can each optionally include one or more of the following features, alone or in combination. In some implementations, a tube light of the plurality of tube lights has a tube light length, the housing including: a base plate having a base length in a first direction, the base length corresponding to the tube light length; a pair of opposing sidewalls attached to the base plate and extending along the base length; and a pair of opposing end walls attached to the base plate and each connecting the pair of sidewalls.

In some implementations, the top plate is configured for releasable attachment to the pair of sidewalls.

In some implementations, the top plate has a top length corresponding to the tube light length.

In some implementations, a ratio between the base length and the tube light length is 1.1 or less.

In some implementations, the base plate has a base width in a second direction orthogonal to the first direction; and the top plate has a top width in the second direction, the top width being greater than the base width.

In some implementations, each tube light of the plurality of tube lights has a respective tube light diameter; and the top width corresponds to a sum of tube light diameters of the plurality of tube lights.

In some implementations, a ratio between the top width and the sum of the tube light diameters is 1.5 or less.

In some implementations, a tube light of the plurality of tube lights has a tube light diameter; and a depth of the trough corresponds to the tube light diameter.

In some implementations, a ratio between the depth of the trough and the tube light diameter is 1.5 or less.

In some implementations, the plurality of tube lights are uniform in tube light diameter and tube light length.

In some implementations, the trough has a trapezoidal prism shape.

In some implementations, the top plate includes openings through which the holders can be raised or lowered.

In some implementations, when the top plate is attached to the housing, the holders are retractable into the housing through the openings.

In some implementations, the holders include, for each of the plurality of tube lights, a first holder configured to receive a first end of the tube light, and a second holder configured to receive a second end of the tube light.

In some implementations, the housing is devoid of a reflector.

In some implementations, the housing is devoid of electrical ballast.

In some implementations, the housing is devoid of a backup battery.

In some implementations, the plurality of tube lights includes two tube lights, three tube lights, four tube lights, five tube lights, six tube lights, seven tube lights, or eight tube lights.

In some implementations, the top plate is releasably attachable to the housing without using tools.

In some implementations, the base plate is ceiling mountable.

In some implementations, the base plate includes one or more openings configured to receive fasteners for mounting the base plate to a surface.

In some implementations, the top plate is attachable to the housing by one or more connectors.

In some implementations, the one or more connectors include one or more latches.

In some implementations, the one or more connectors include one or more bridge lance connectors.

In some implementations, the top plate is attachable to a first sidewall of the pair of sidewalls by one or more hinges and is attachable to a second sidewall of the pair of sidewalls by one or more latches.

In some implementations, the plurality of tube lights include light emitting diode (LED) tube lights.

In some implementations, the top plate has a surface extending along a plane, and the housing does not extend beyond the surface of the top plate in the plane when the top plate is attached to the housing.

In general, innovative aspects of the subject matter described in this specification can be embodied in a method of assembly for a lighting fixture, including: releasing a connector to detach a top plate from a housing, the housing defining a trough that is sized to contain a plurality of tube lights, the top plate supporting holders for the plurality of tube lights; removing the plurality of tube lights from the trough; inserting the plurality of tube lights into the respective holders; and engaging the connector to attach the top plate to the housing. The top plate and the housing enclose the trough when the top plate is attached to the housing.

The foregoing and other embodiments can each optionally include one or more of the following features, alone or in combination. In some implementations, the holders are retractable into the housing when the top plate is attached to the housing and the method includes extending the holders outside the housing before inserting the plurality of tube lights into the holders.

In some implementations, the top plate includes openings through which the holders can be raised or lowered; and extending the holders outside the housing includes raising the holders through the openings.

In some implementations, each holder is configured to provide an electrical connection to a respective tube light of the plurality of tube lights.

In some implementations, the method includes: removing a plurality of tube lights from the respective holders; releasing the connector to detach the top plate from the housing; inserting the plurality of tube lights into the trough; and engaging the connector to attach the top plate to the housing.

In some implementations, the method includes retracting the holders into the housing after removing the plurality of tube lights from the respective holders.

In some implementations, the top plate includes openings through which the holders can be raised or lowered; and retracting the holders into the housing includes lowering the holders through the openings.

In some implementations, a tube light of the plurality of tube lights has a tube light length; and the housing includes: a base plate having a base length in a first direction, the base length corresponding to the tube light length; a pair of opposing sidewalls attached to the base plate and extending along the base length; and a pair of opposing end walls attached to the base plate and each connecting the pair of sidewalls.

In some implementations, the top plate is configured for releasable attachment to the pair of sidewalls.

In some implementations, a tube light of the plurality of tube lights has a tube light length, and the top plate has a top length corresponding to the tube light length.

In some implementations, a ratio between the base length and the tube light length is 1.1 or less.

In some implementations, the base plate has a base width in a second direction orthogonal to the first direction; and the top plate has a top width in the second direction, the top width being greater than the base width.

In some implementations, each tube light of the plurality of tube lights has a tube light diameter; and the top width corresponds to a sum of tube light diameters of the plurality of tube lights.

In some implementations, a ratio between the top width and the sum of the tube light diameters is 1.5 or less.

In some implementations, a tube light of the plurality of tube lights has a tube light diameter; and a depth of the trough corresponds to the tube light diameter.

In some implementations, a ratio between the depth of the trough and the tube light diameter is 1.5 or less.

In some implementations, the plurality of tube lights are uniform in tube light diameter and tube light length.

In some implementations, the plurality of tube lights includes two tube lights, three tube lights, four tube lights, five tube lights, six tube lights, seven tube lights, or eight tube lights.

In some implementations, the trough has a trapezoidal prism shape.

In some implementations, the method includes mounting the base plate to a ceiling.

In some implementations, mounting the base plate to the ceiling includes passing fasteners through one or more openings through the base plate.

In some implementations, the connector includes a latch.

In some implementations, the connector includes a bridge lance connector.

In some implementations, the top plate is attachable to a first sidewall of the pair of sidewalls by one or more hinges and is attachable to a second sidewall of the pair of sidewalls by one or more latches, and engaging the connector includes engaging a latch of the one or more latches.

In some implementations, the plurality of tube lights include light emitting diode (LED) tube lights.

In general, innovative aspects of the subject matter described in this specification can be embodied in a method of preparing a lighting fixture for shipping, including: inserting a plurality of tube lights into a trough of a housing of the light fixture, the trough being sized to contain the plurality of tube lights; and engaging a connector to attach a top plate of the light fixture to the housing. The top plate supports holders for the plurality of tube lights, and the top plate and the housing enclose the trough when the top plate is attached to the housing.

The foregoing and other embodiments can each optionally include one or more of the following features, alone or in combination. In some implementations, the method includes inserting the lighting fixture into a shipping package.

In some implementations, the method includes stacking the lighting fixture with one or more other lighting fixtures inside the shipping package.

In some implementations, each holder is configured to provide an electrical connection to a respective tube light of the plurality of tube lights.

In some implementations, the holders are retractable into the housing when the top plate is attached to the housing, the method including: retracting the holders into the housing.

In some implementations, the top plate includes openings through which the holders can be raised or lowered; and retracting the holders into the housing includes lowering the holders through the openings.

In some implementations, a tube light of the plurality of tube lights has a tube light length, the housing including: a base plate having a base length in a first direction, the base length corresponding to the tube light length; a pair of opposing sidewalls attached to the base plate and extending along the base length; and a pair of opposing end walls attached to the base plate and each connecting the pair of sidewalls.

In some implementations, the top plate is configured for releasable attachment to the pair of sidewalls.

In some implementations, the top plate has a top length corresponding to the tube light length.

In some implementations, a ratio between the base length and the tube light length is 1.1 or less.

In some implementations, the base plate has a base width in a second direction orthogonal to the first direction; and the top plate has a top width in the second direction, the top width being greater than the base width.

In some implementations, each tube light of the plurality of tube lights has a tube light diameter; and the top width corresponds to a sum of tube light diameters of the plurality of tube lights.

In some implementations, a ratio between the top width and the sum of the tube light diameters is 1.5 or less.

In some implementations, a tube light of the plurality of tube lights has a tube light diameter; and a depth of the trough corresponds to the tube light diameter.

In some implementations, a ratio between the depth of the trough and the tube light diameter is 1.5 or less.

In some implementations, the plurality of tube lights are uniform in tube light diameter and tube light length.

In some implementations, the trough has a trapezoidal prism shape.

In some implementations, the method further including mounting the base plate to a surface.

In some implementations, mounting the base plate to the surface includes passing fasteners through one or more openings in the base plate.

In some implementations, the connector includes a latch.

In some implementations, the connector includes a bridge lance connector.

In some implementations, the top plate is attachable to a first sidewall of the pair of sidewalls by one or more hinges and is attachable to a second sidewall of the pair of sidewalls by one or more latches, and engaging the connector includes engaging a latch of the one or more latches.

In some implementations, the plurality of tube lights include light emitting diode (LED) tube lights.

In some implementations, the method further includes, prior to inserting the plurality of tube lights into the trough, releasing the connector to detach the top plate from the housing.

The disclosed systems and methods can result in the following advantages. The lighting fixture assembly can be devoid of ballast, backup batteries, and reflectors, reducing the size and weight of the lighting fixture assemblies. Due to the compact size, less material is needed to form the lighting assembly, reducing costs and environmental impact. The housing is close-fitting with the tube lights, reducing movement of the tube lights inside the trough. The reduced movement can reduce the likelihood of damage and reduce the need to package the lighting fixture with cushioning material.

The housing of the lighting fixture can be sized to contain the same number of tube lights that the lighting fixture is configured to hold during operation of the lighting fixture. For example, a lighting fixture configured to hold and energize six tube lights can have a housing that is sized to contain six tube lights. The lighting fixture can therefore be shipped with the appropriate number of tube lights for use with the lighting fixture. The lighting fixture can be stored with the appropriate number of tube lights contained in the trough, and can be shipped on demand, reducing the time of packaging the lighting fixture for shipment. Because the tube lights fit inside the housing, the size of the shipping package can be reduced, therefore reducing shipping costs.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1A:
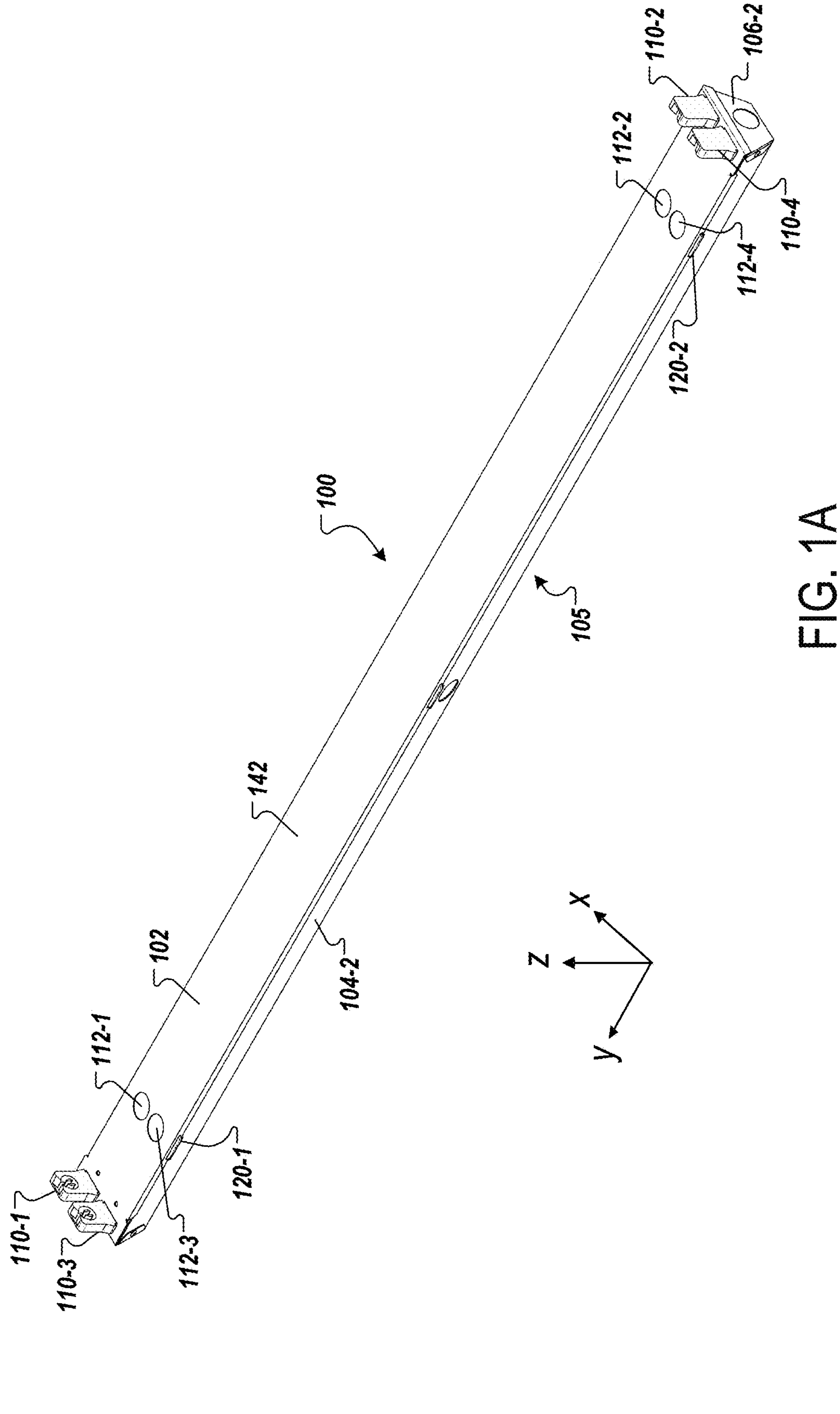
FIG. 1A is a perspective view of an example lighting fixture assembly configured to hold two tube lights.

FIGS. 1A-7 depict an example lighting fixture assembly 100. Referring to FIG. 1A, the example lighting fixture assembly 100 is configured to hold two tube lights.

The assembly 100 includes a top plate 102. The top plate 102 supports holders 110-1, 110-2, 110-3, 110-4 (collectively referred to herein as "holders 110") for tube lights. Each holder 110 is configured to provide an electrical connection to a tube light. In some examples, each holder 110 includes an electrical socket for receiving an end of a tube light. The tube light can include pins for connecting to the electrical socket. The pins can each be, for example, a G13 bipin.

Figures 2, 3A, 3B:
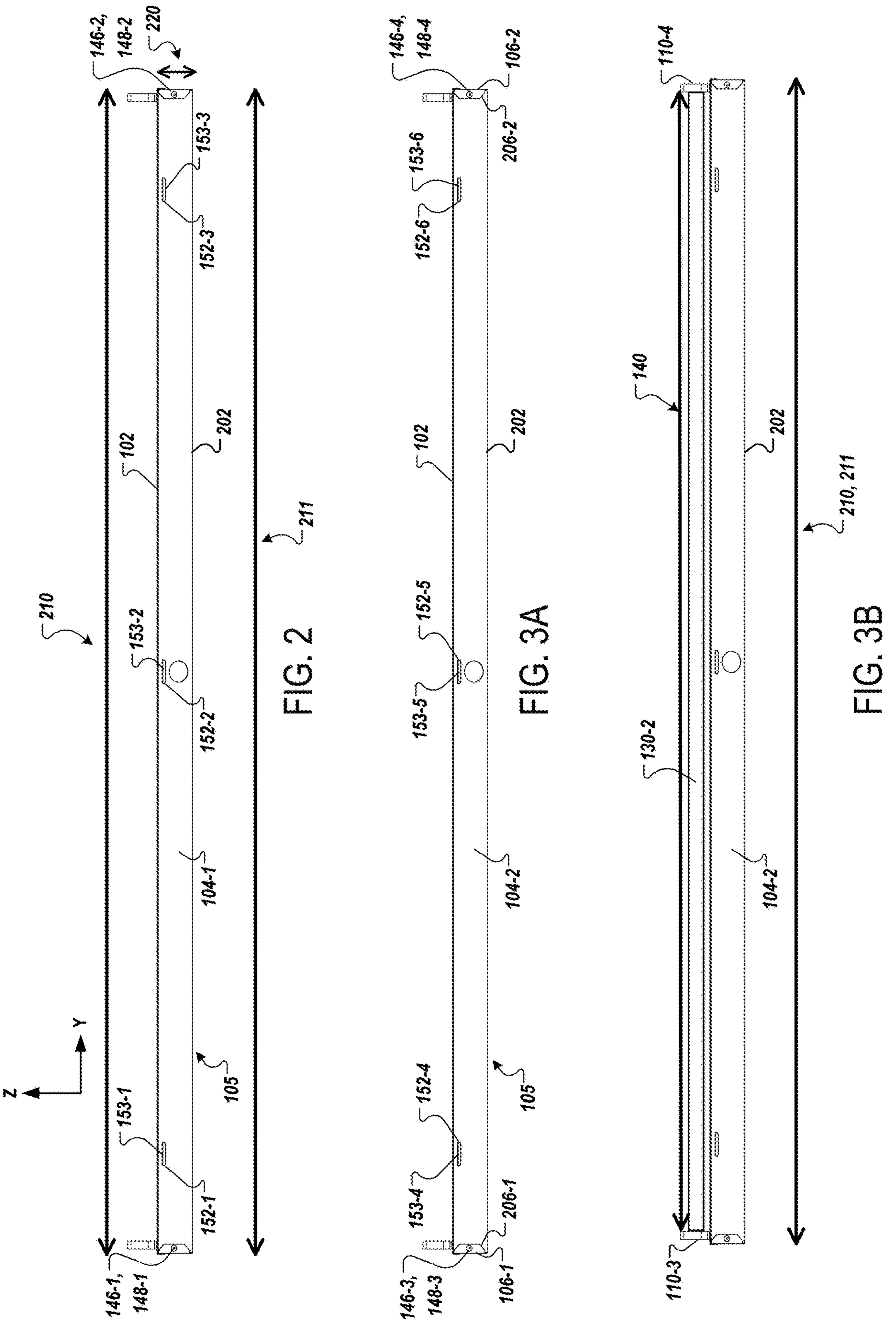
FIG. 2 is a right side view of the example lighting fixture assembly of FIG. 1A.
FIG. 3A is a left side view of the example lighting fixture assembly of FIG. 1A.
FIG. 3B is a left side view of the example lighting fixture assembly of FIG. 1A holding two tube lights.
Figure 5C:
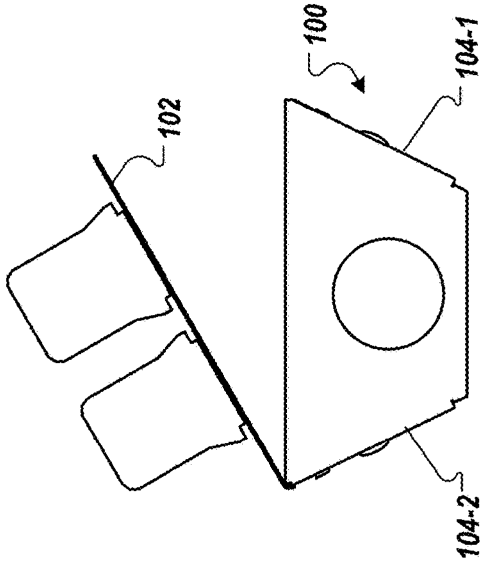
FIG. 5C is a front view of the example lighting fixture assembly of FIG. 1A with the top plate detached from the left sidewall.
Figure 5D:
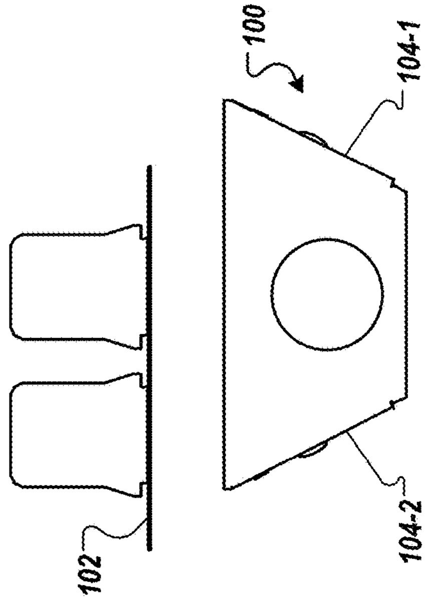
FIG. 5D is a front view of the example lighting fixture of FIG. 1A with the top plate detached from the housing.
Figure 5A:
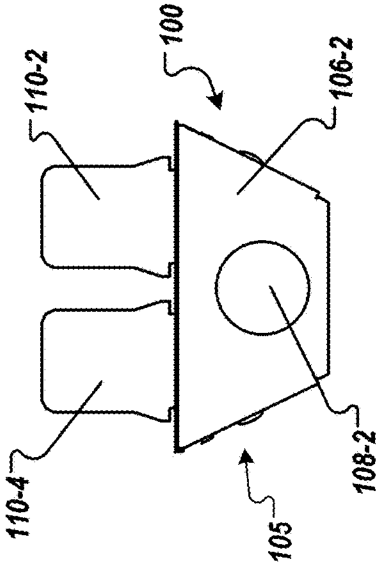
FIG. 5A is a front view of the example lighting fixture assembly of FIG. 1A with holders extended.
Figure 5B:
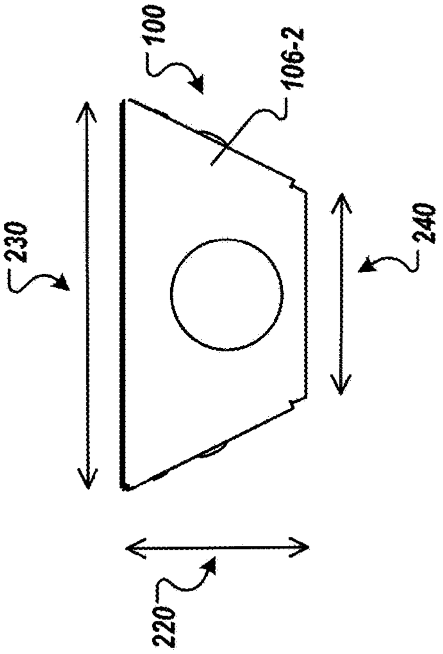
FIG. 5B is a front view of the example lighting fixture assembly of FIG. 1A with holders retracted.
Figure 5E:
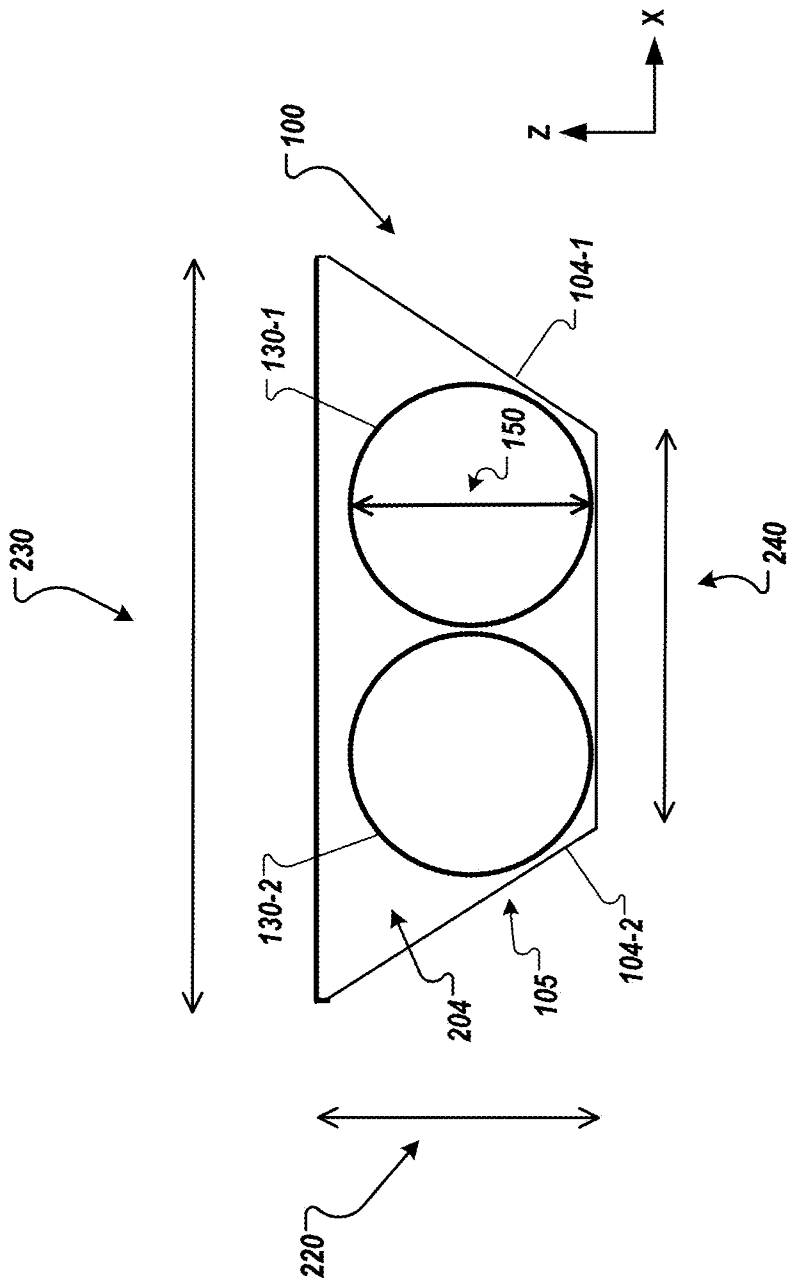
FIG. 5E is a cross-sectional front view of the example lighting fixture assembly of FIG. 1A with two tube lights contained in the trough of the housing.
Figure 6A:
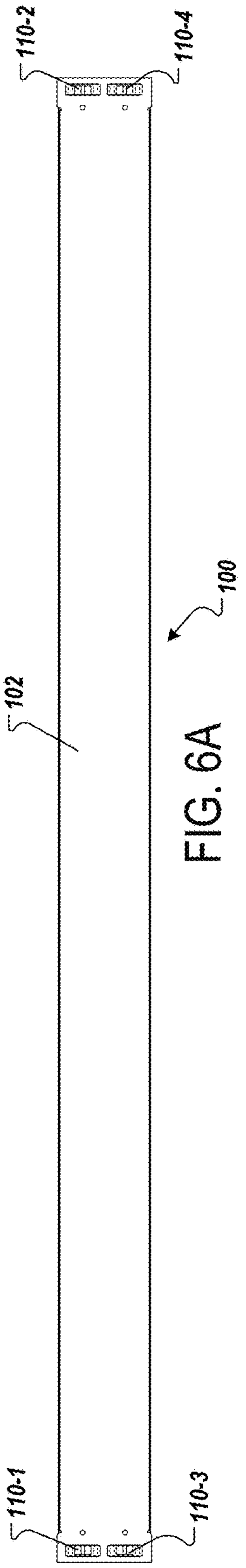
FIG. 6A is a top view of the example lighting fixture assembly of FIG. 1A with the top plate attached to the housing.
Figure 6B:
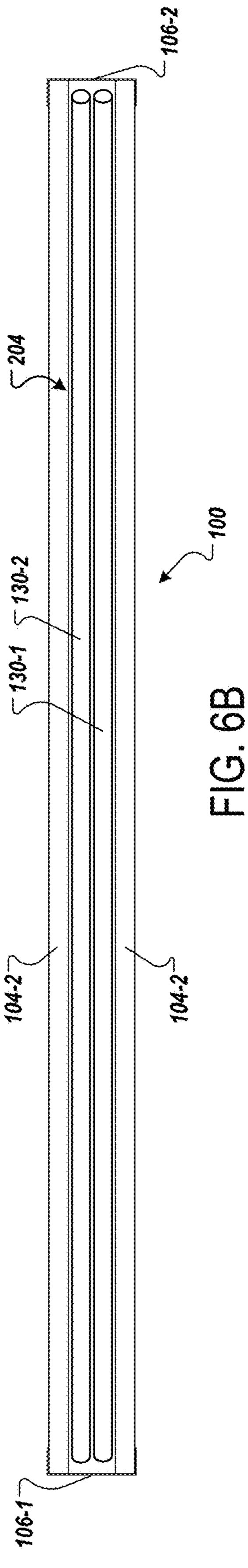
FIG. 6B is a top view of the example lighting fixture assembly of FIG. 1A with the top plate detached from the housing and two tube lights contained in the trough of the housing.

Referring to FIGS. 1A and 5E, the assembly 100 includes a housing 105 defining a trough 204. The top plate 102 is configured for releasable attachment to the housing 105. The top plate 102 and the housing 105 enclose the trough 204 when the top plate 102 is attached to the housing 105. In some examples, the trough 204 has a trapezoidal prism shape. The housing 105 includes sidewall 104-2 and opposing sidewall 104-1. Referring to FIGS. 3A and 6B, the housing 105 includes end wall 106-2 and opposing end wall 106-1 that each connect the pair of sidewalls 104-1, 104-2.

The top plate 102 has a surface extending along a plane (e.g., the x-y plane), and, in some examples, the housing 105 does not extend beyond the surface of the top plate 102 in the plane when the top plate 102 is attached to the housing 105. For example, as can be seen in FIG. 1A, when the top plate 102 is attached to the housing 105, the sidewalls 104-1, 104-2 and end walls 106-1, 106-2 do not extend beyond the plane along which a top surface 142 top plate 102 extends.

In some examples, the top plate 102 can be releasably attached to the housing 105 without using tools. For example, the top plate 102 can be attachable to the housing by one or more mechanical connectors 120-1, 120-2, ("connectors 120") formed on the top plate 102 and the housing 105. In some examples, the connectors 120 include latches. In some examples, the connectors 120 include bridge lance connectors. For example, referring to FIGS. 2, 3A, and 3B, the sidewalls 104-1, 104-2 of the housing 105 can define a one or more apertures 152-1, 152-2, 152-3, 152-4, 152-5, 152-6 that are each configured to receive corresponding lances formed 153-1, 153-2, 153-3, 153-4, 153-5, 153-6 formed on the top plate 102. Referring to FIG. 1A, the top plate 102 includes openings 112-1, 112-2, 112-3, 112-4 ("openings 112") that enable access to an inside portion of the connectors 120 for disengaging the connectors 120 to release the top plate 102 from the housing 105.

Figures 1B, 1C:
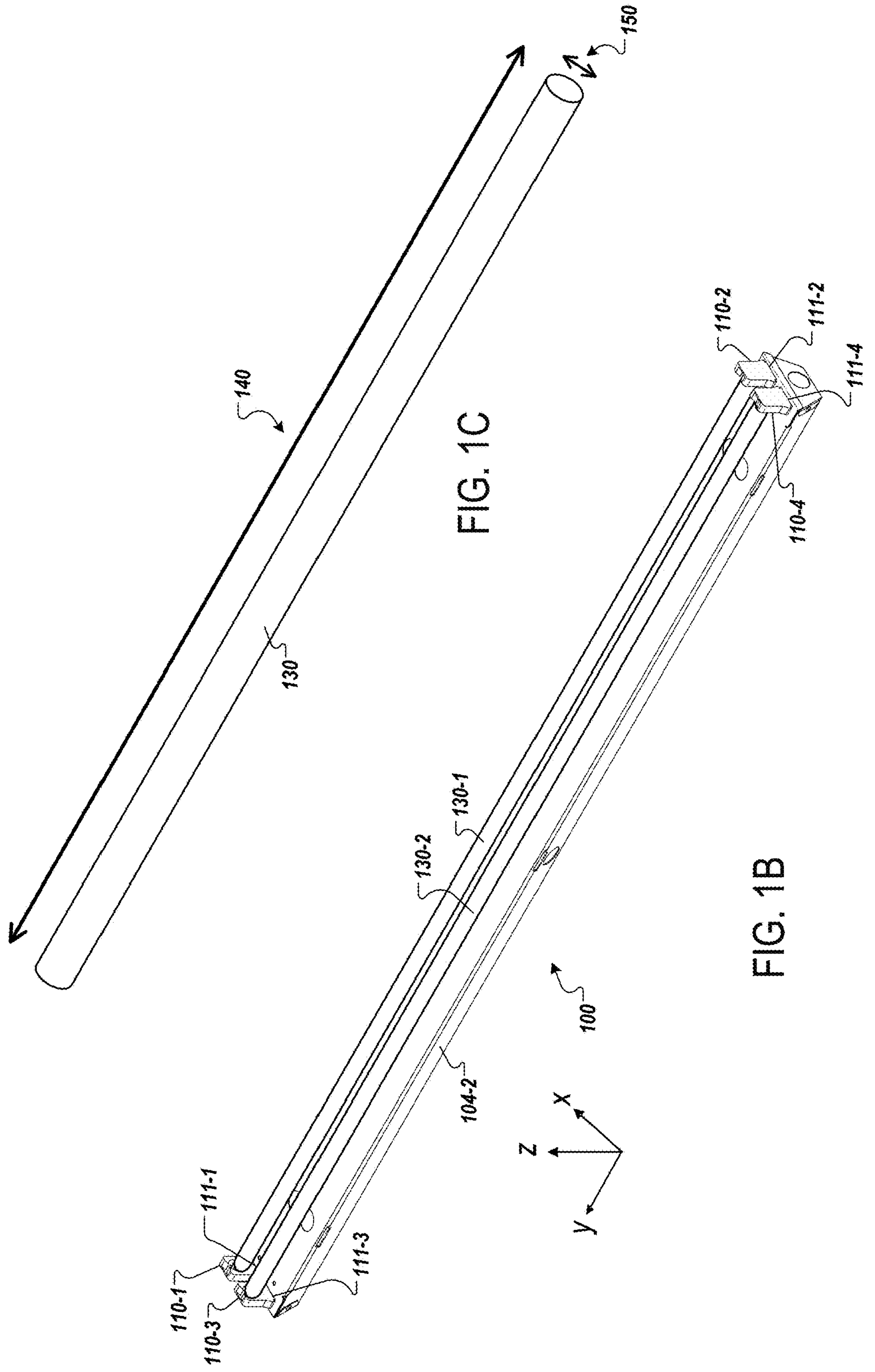
FIG. 1B is a perspective view of the example lighting fixture assembly of FIG. 1A holding two tube lights.
FIG. 1C is a perspective view of an example tube light.

FIG. 1B is a perspective view of the example lighting fixture assembly 100 holding two tube lights 130-1, 130-2. The tube light 130-1 is held by holder 110-1 at one end and by holder 110-2 at an opposite end. The tube light 130-2 is held by holder 110-3 at one end and by holder 110-4 at an opposite end. As can be seen in FIG. 1B, the assembly 100 is devoid of a diffuser, lens, cover, or shade, such that when the assembly 100 is mounted (e.g., to a ceiling), the tube lights 130 are exposed.

The top plate 102 includes openings through which the holders can be raised or lowered. For example, the top plate 102 includes opening 111-2 through which the holder 110-2 can be raised or lowered. The top plate 102 includes opening 111-4 through which the holder 110-4 can be raised or lowered. The top plate 102 includes opening 111-3 through which the holder 110-3 can be raised or lowered. The top plate 102 includes opening 111-1 through which the holder 110-1 can be raised or lowered. The holders 110 are retractable into the housing through the openings 111 when the top plate 102 is attached to the housing 105. For example, FIG. 5A depicts a front view of the example lighting fixture assembly 100, with holders extended and FIG. 5B is a front view of the example lighting fixture assembly 100, with holders retracted. In some implementations, the holders 110 are retracted into the housing 105 during storage and shipment of the light fixture assembly 100, and are raised to extend through the openings 111 outside the housing 105 during installation of the light fixture assembly 100.

FIG. 1C is a perspective view of an example tube light 130 that can be coupled to the light fixture assembly 100. The tube light 130 can be, for example, an LED light bulb. The tube light 130 has a tube light length 140 and a tube light diameter 150. In some examples, the lighting fixture assembly is configured to hold multiple tube lights that are uniform in tube light diameter 150 and tube light length 140. Example tube lights 130 that can be used with the light fixture assembly 100 include T8 LED tube, with a tube light diameter of 1.0 inch, T12 LED tube, with a tube light diameter of 1.5 inches, T5HO LED tube, with a tube light diameter of ⅝ inches. The number after the letter "T" indicates the diameter of the tube, in eighths of an inch. Each of these LED tube light types can be provided in a variety of lengths, ranging from one foot (30 cm) to eight feet (240 cm). In some examples, the tube light length 140 is two feet. In some examples, the tube light length 140 is four feet.

Figure 7:
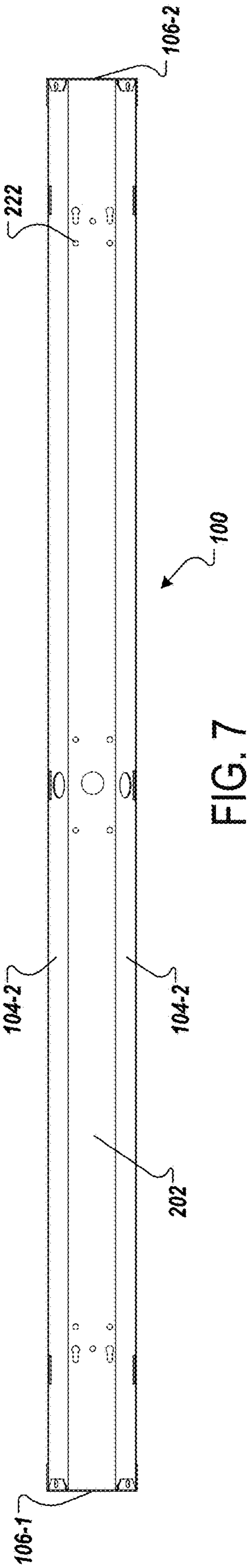
FIG. 7 is a bottom view of the example lighting fixture assembly of FIG. 1A.
Figure 8:
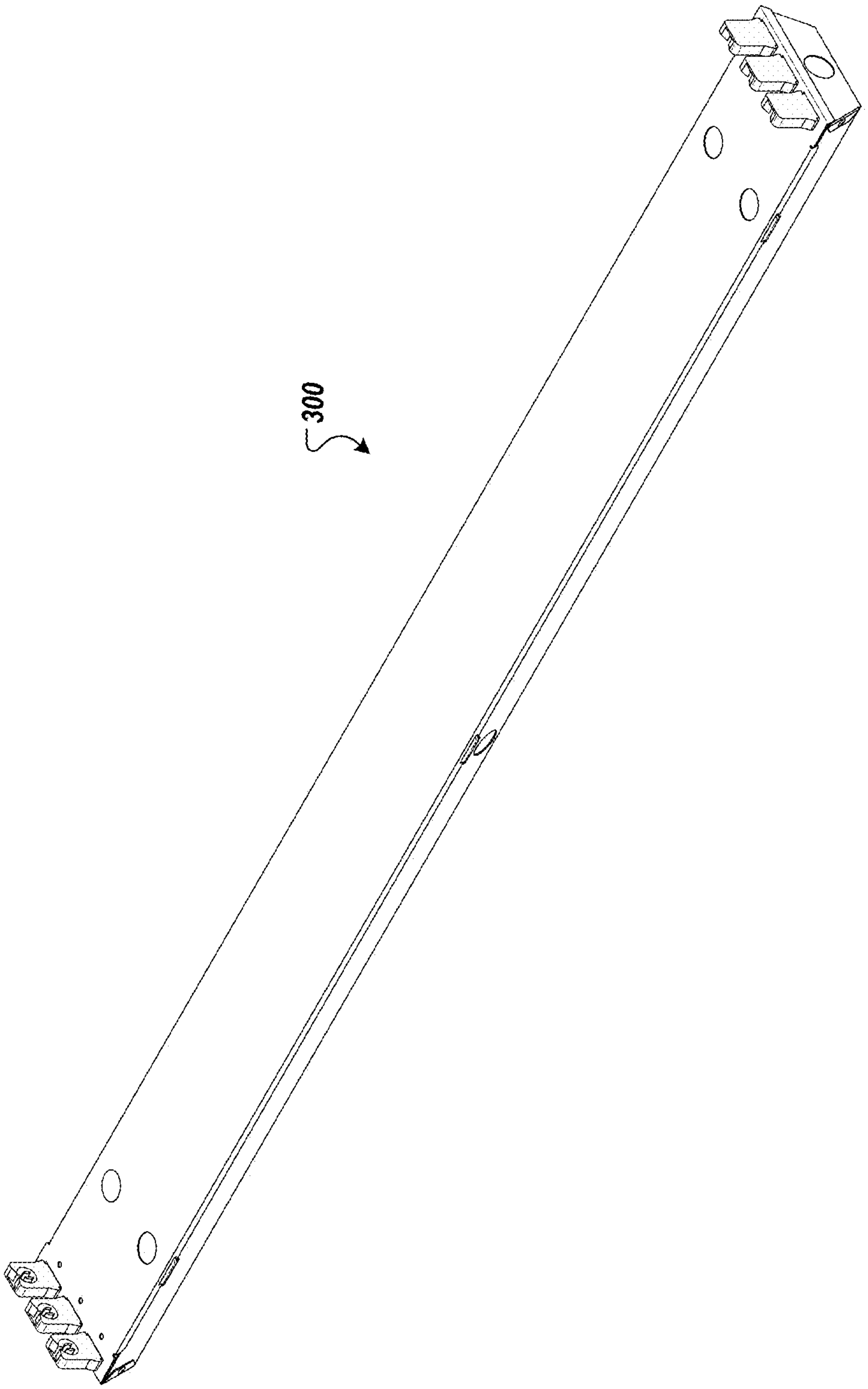
FIG. 8 is a perspective view of an example lighting fixture assembly configured to hold three tube lights.
Figure 9:
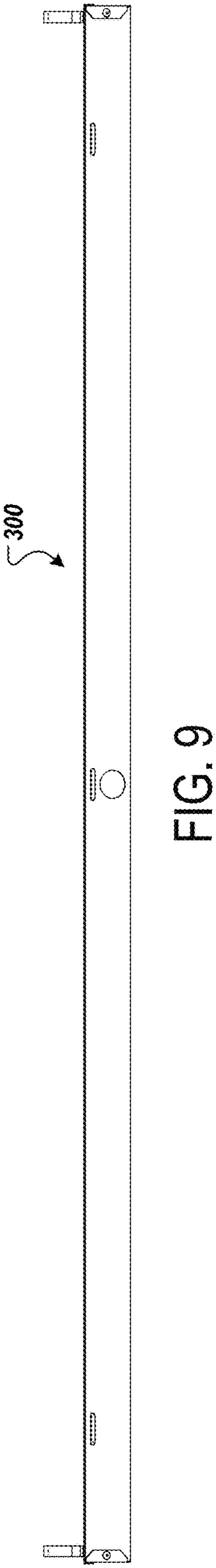
FIG. 9 is a right side view of the example lighting fixture assembly of FIG. 8.
Figure 10:
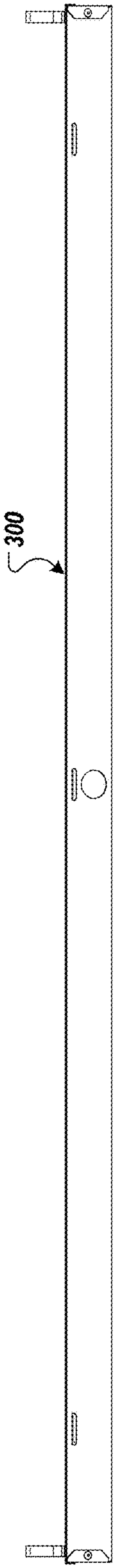
FIG. 10 is a left side view of the example lighting fixture assembly of FIG. 8.
Figure 12:
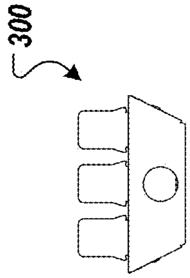
FIG. 12 is a front view of the example lighting fixture assembly of FIG. 8.
Figure 11:
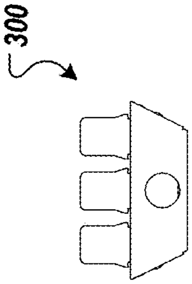
FIG. 11 is a rear view of the example lighting fixture assembly of FIG. 8.
Figure 13:
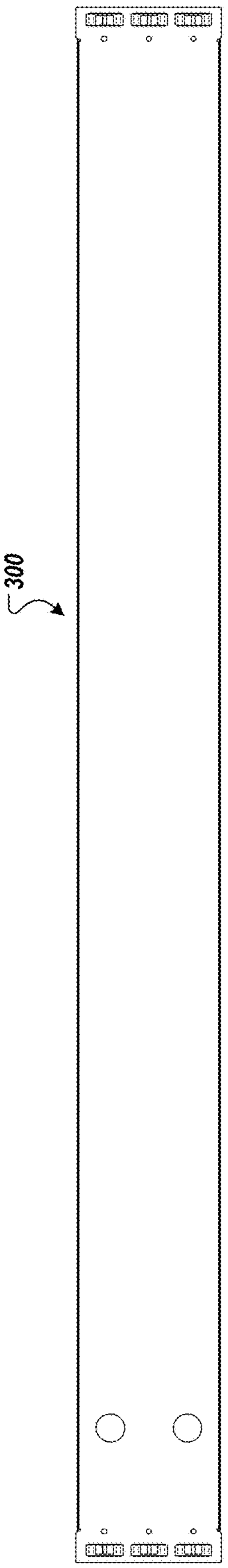
FIG. 13 is a top view of the example lighting fixture of FIG. 8.
Figure 14:
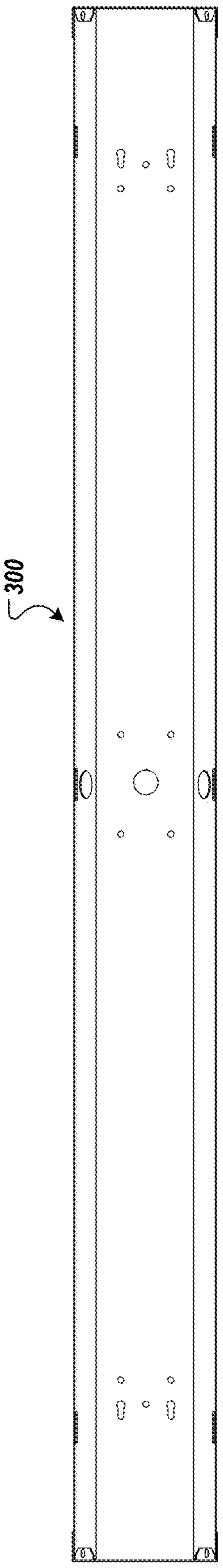
FIG. 14 is a bottom view of the example lighting fixture assembly of FIG. 8.
Figure 15:
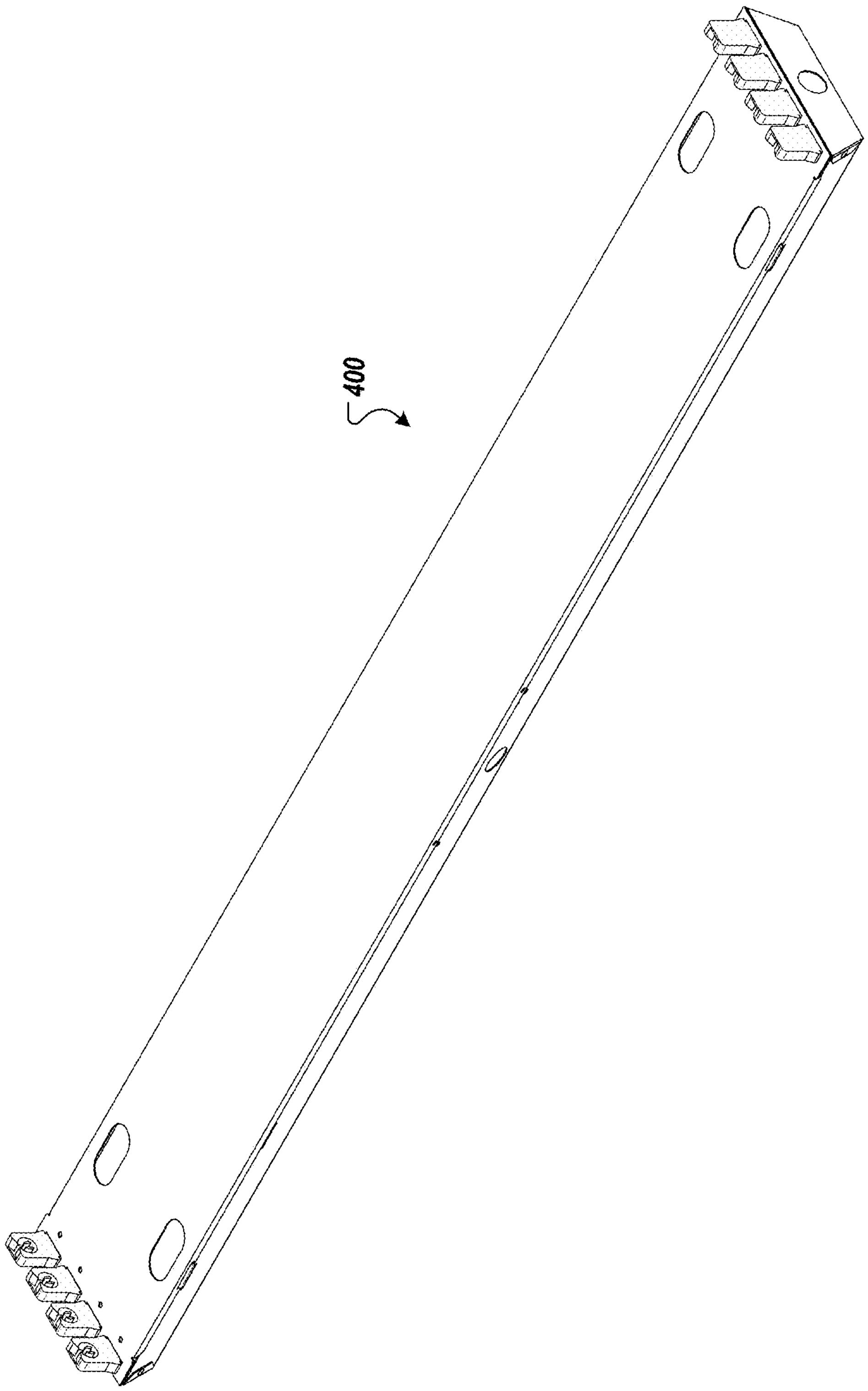
FIG. 15 is a perspective view of an example lighting fixture assembly configured to hold four tube lights.
Figure 16:
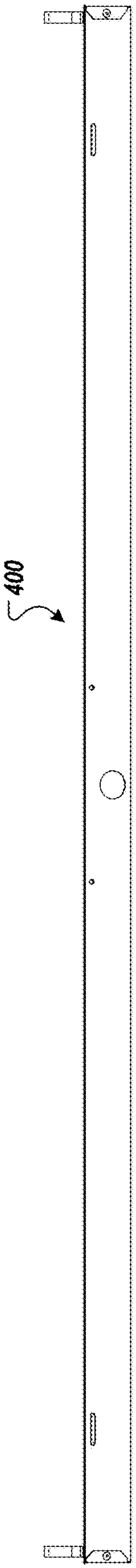
FIG. 16 is a right side view of the example lighting fixture assembly of FIG. 15.
Figure 17:
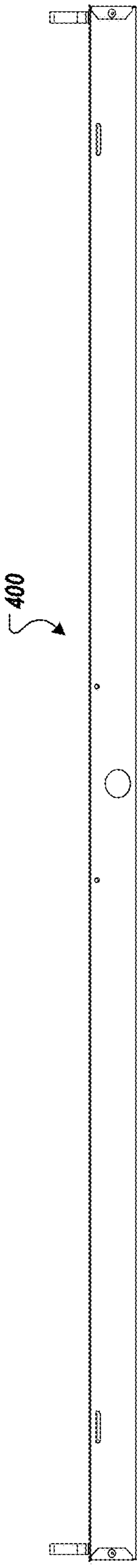
FIG. 17 is a left side view of the example lighting fixture assembly of FIG. 15.
Figure 19:
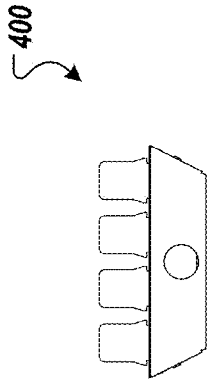
FIG. 19 is a front view of the example lighting fixture assembly of FIG. 15.
Figure 18:
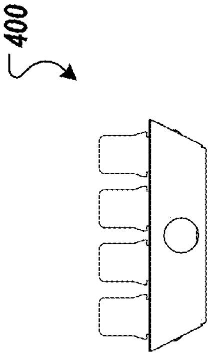
FIG. 18 is a rear view of the example lighting fixture assembly of FIG. 15.
Figure 20:
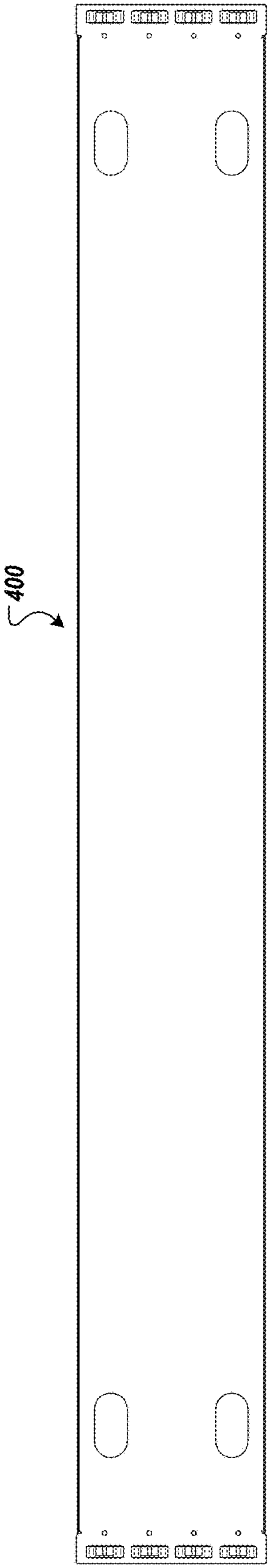
FIG. 20 is a top view of the example lighting fixture assembly of FIG. 15.
Figure 21:
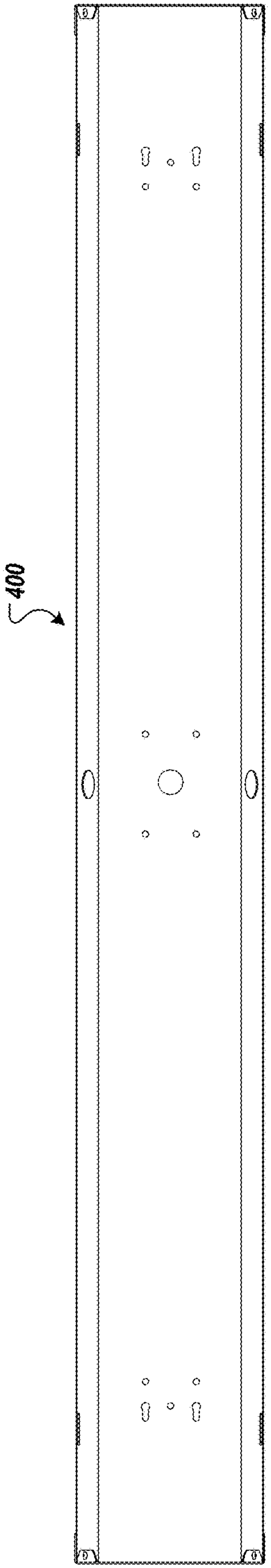
FIG. 21 is a bottom view of the example lighting fixture assembly of FIG. 15.
Figure 22:
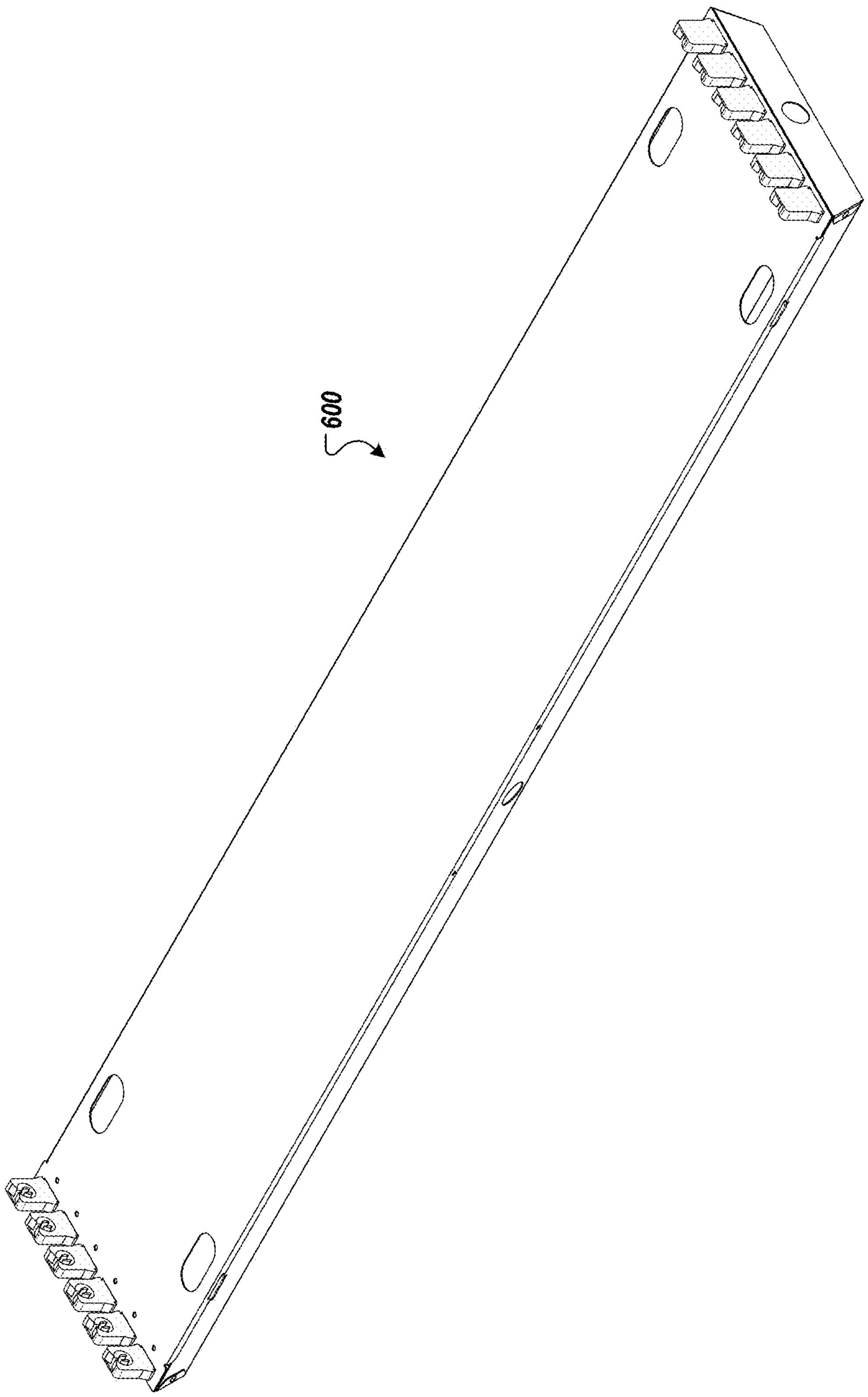
FIG. 22 is a perspective view of an example lighting fixture assembly configured to hold six tube lights.
Figure 23:
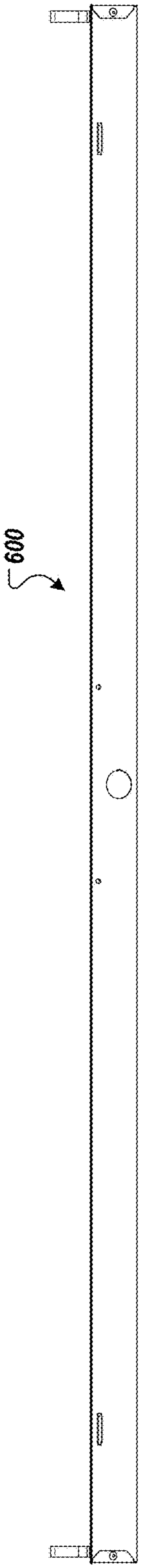
FIG. 23 is a right side view of the example lighting fixture assembly of FIG. 22.
Figure 24:
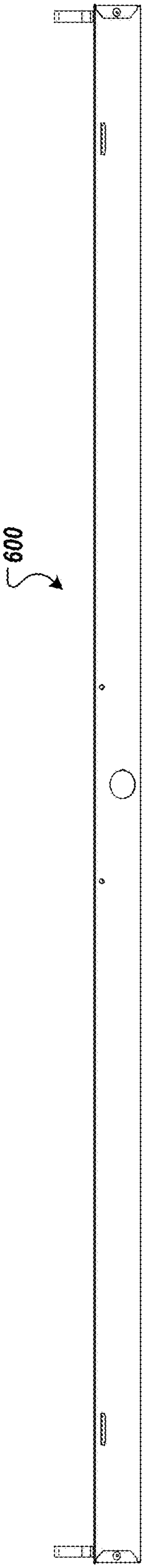
FIG. 24 is a left side view of the example lighting fixture assembly of FIG. 22.
Figure 26:
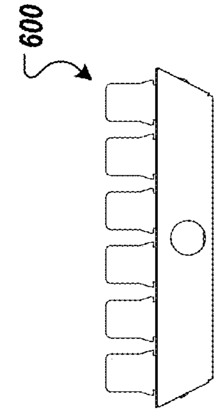
FIG. 26 is a front view of the example lighting fixture assembly of FIG. 22.
Figure 25:
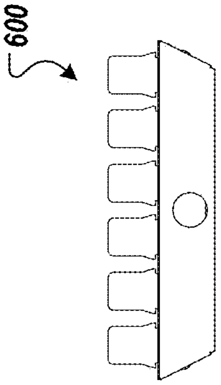
FIG. 25 is a rear view of the example lighting fixture of FIG. 22.
Figure 27:
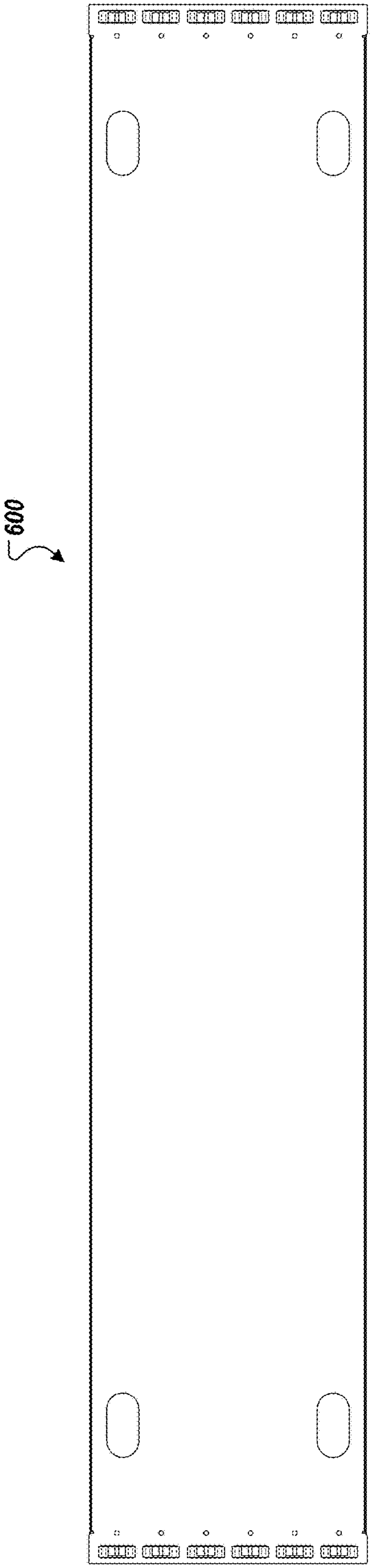
FIG. 27 is a top view of the example lighting fixture assembly of FIG. 22.
Figure 28:
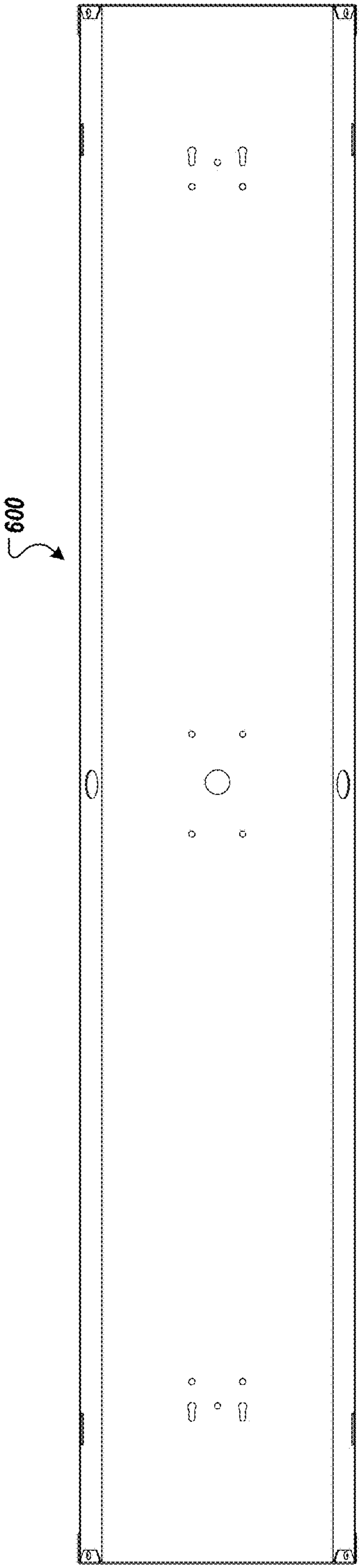
FIG. 28 is a bottom view of the example lighting fixture assembly of FIG. 22.
Figure 29:
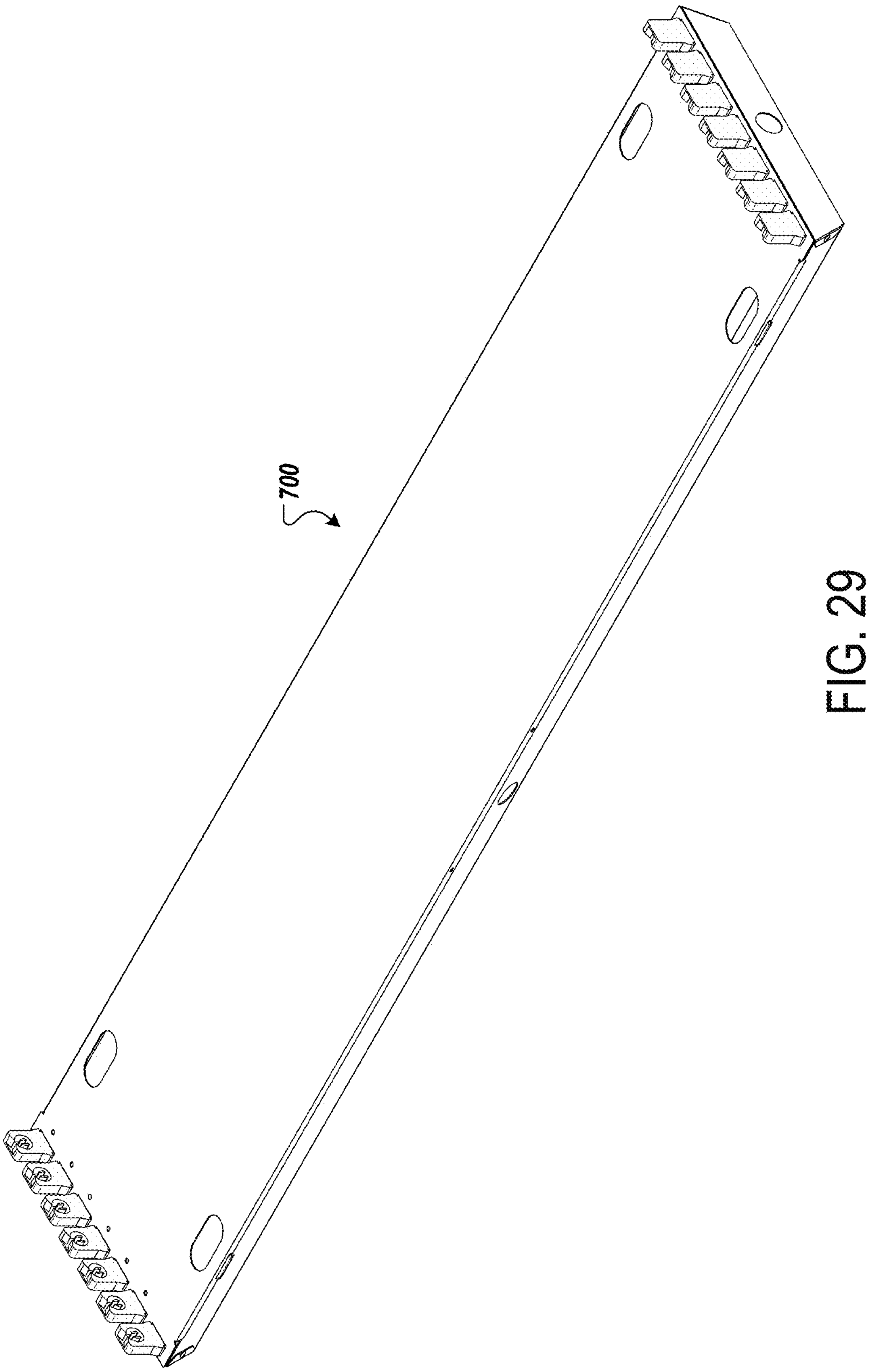
FIG. 29 is a perspective view of an example lighting fixture assembly configured to hold seven tube lights.
Figure 30:
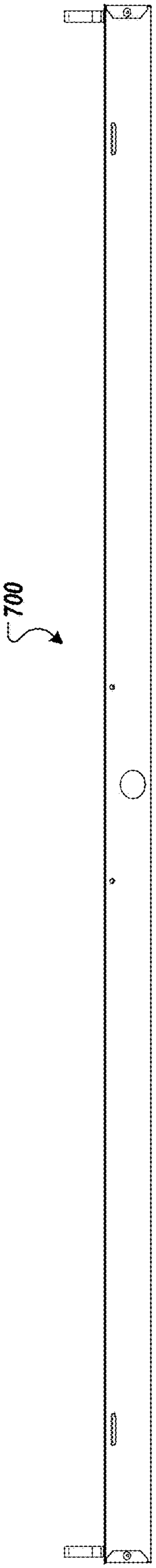
FIG. 30 is a right side view of the example lighting fixture assembly of FIG. 29.
Figure 31:
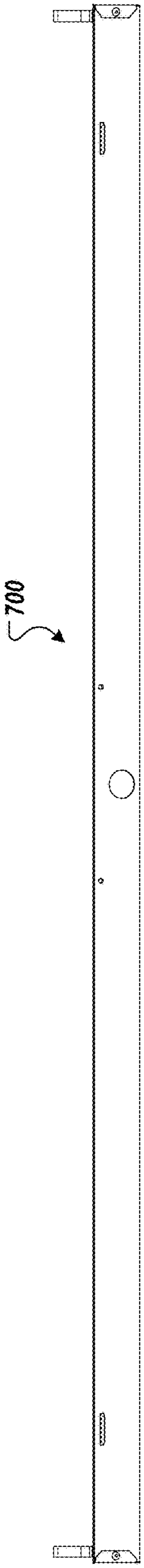
FIG. 31 is a left side view of the example lighting fixture assembly of FIG. 29.
Figure 32:
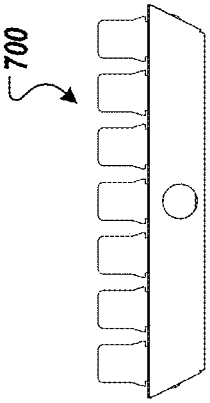
FIG. 32 is a rear view of the example lighting fixture assembly of FIG. 29.
Figure 33:
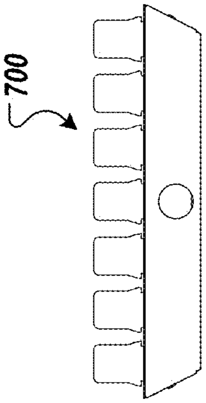
FIG. 33 is a front view of the example lighting fixture assembly of FIG. 29.
Figure 34:
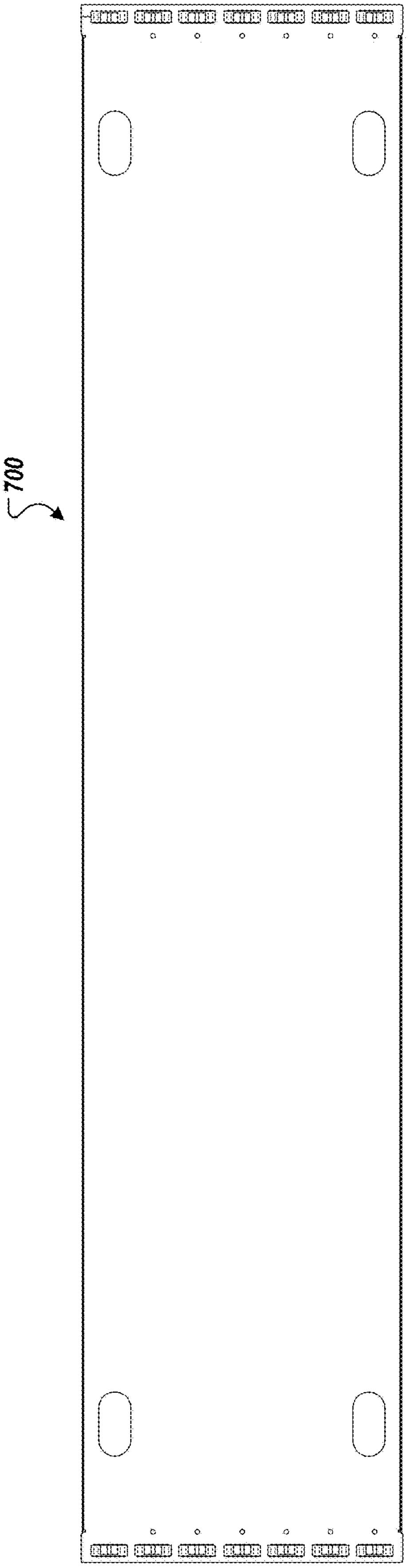
FIG. 34 is a top view of the example lighting fixture assembly of FIG. 29.
Figure 35:
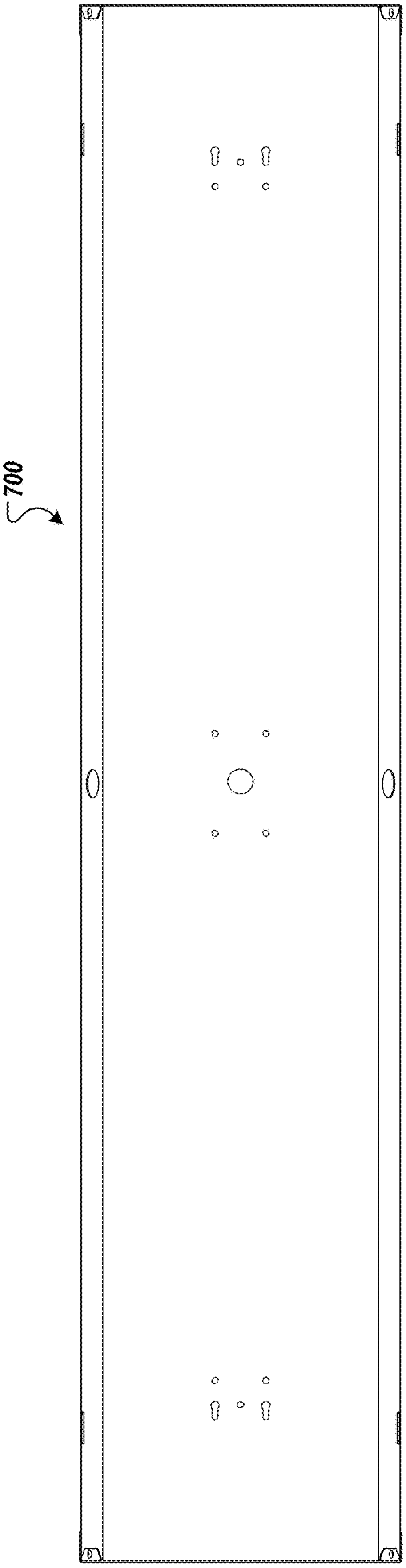
FIG. 35 is a bottom view of the example lighting fixture assembly of FIG. 29.
Figure 36:
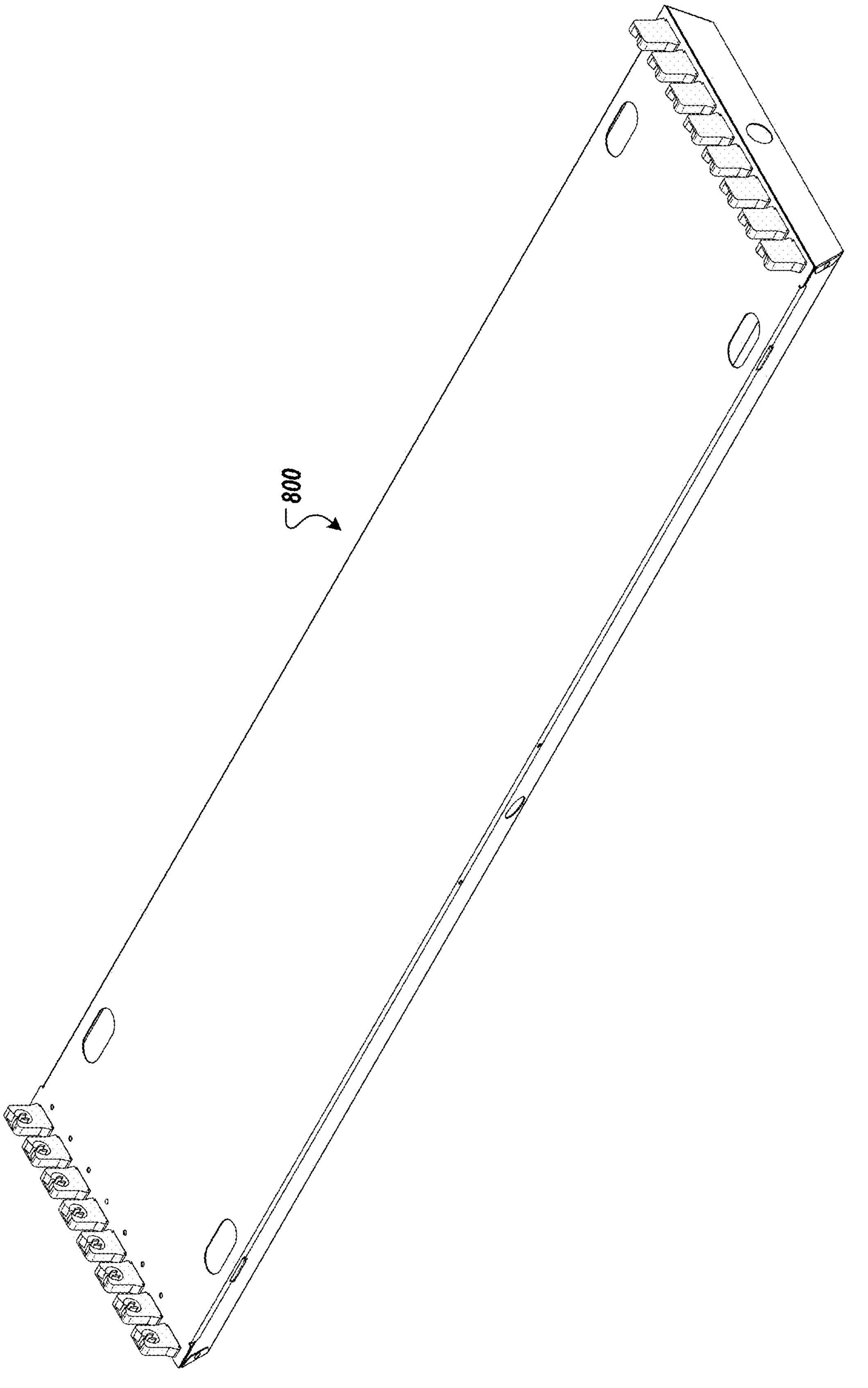
FIG. 36 is a perspective view of an example lighting fixture assembly configured to hold eight tube lights.
Figure 37:
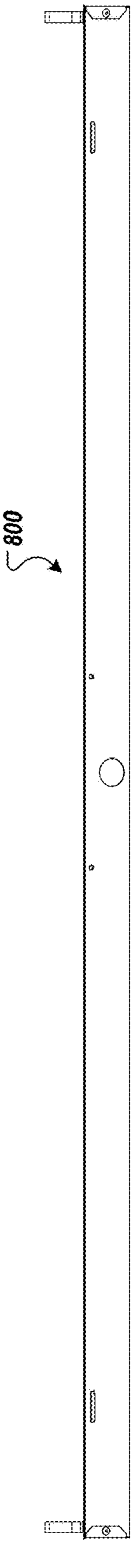
FIG. 37 is a right side view of the example lighting fixture assembly of FIG. 36.
Figure 38:
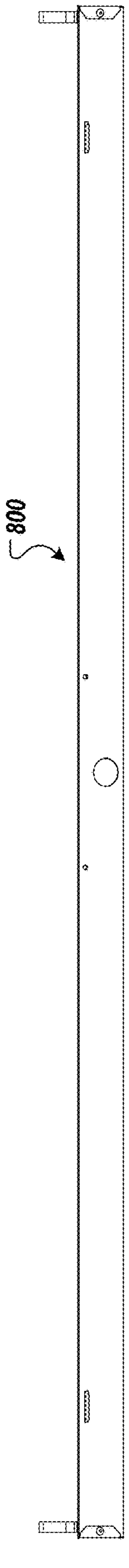
FIG. 38 is a left side view of the example lighting fixture assembly of FIG. 36.
Figure 40:
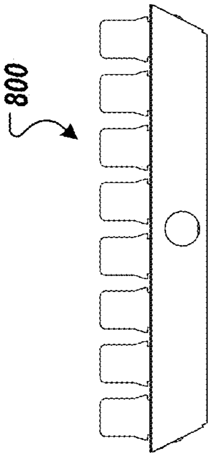
FIG. 40 is a front view of the example lighting fixture assembly of FIG. 36.
Figure 39:
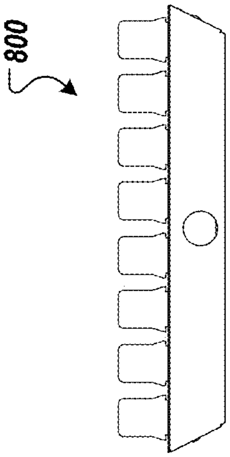
FIG. 39 is a rear view of the example lighting fixture of FIG. 36.
Figure 41:
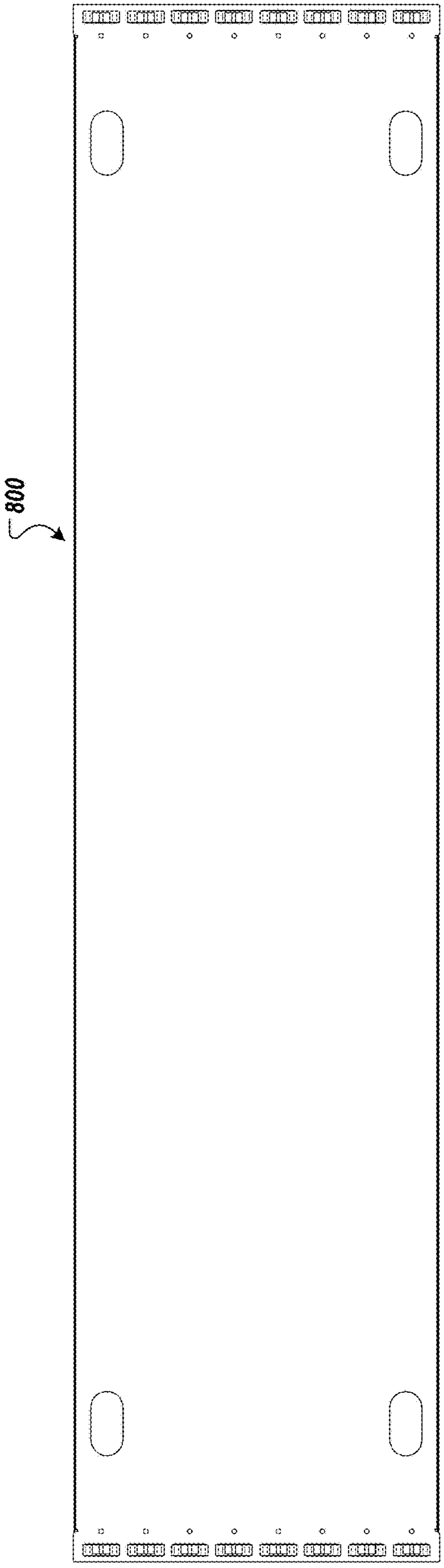
FIG. 41 is a top view of the example lighting fixture assembly of FIG. 36.
Figure 42:
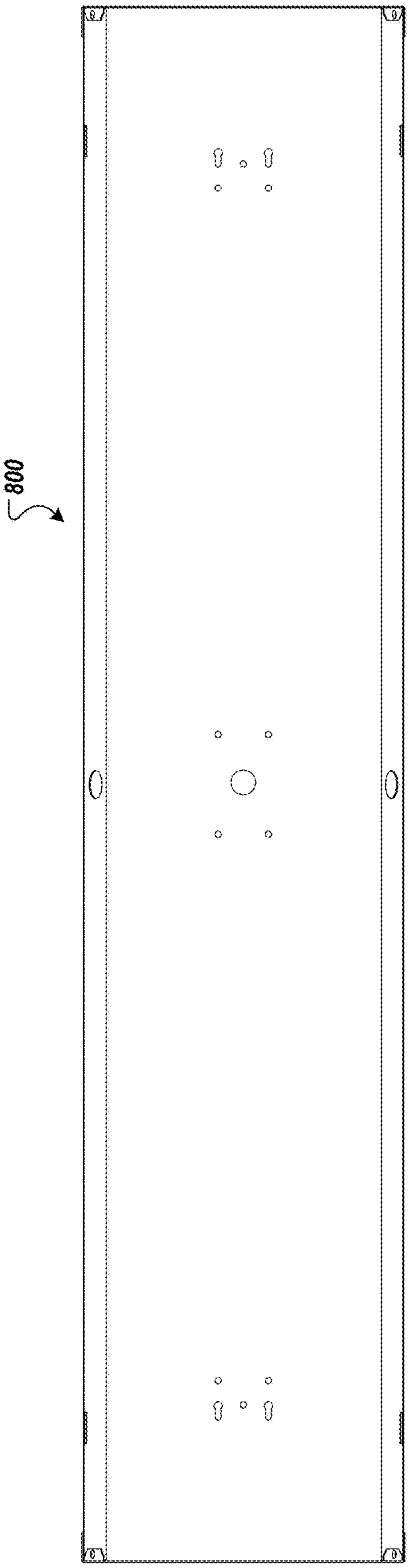
FIG. 42 is a bottom view of the example lighting fixture assembly of FIG. 36.

Referring to FIGS. 2, 3A, and 3B, the light fixture assembly 100 includes a base plate 202. As can be seen in FIG. 7, the base plate includes one or more openings 222 through which fasteners can be passed to mount the base plate 202 to the ceiling. The fasteners can include, for example, screws, nails, clips, buckles, and hangers.

The base plate 202 has a base length 211 in a first direction (e.g., the x-direction). The base length 211 corresponds to the tube light length 140. In some examples, a ratio between the base length 211 and the tube light length 140 is 1.1 or less. Similarly, the top plate 102 has a top length 210. The top length 210 corresponds to the tube light length 140. In some examples, a ratio between the top length 210 and the tube light length 140 is 1.1 or less. In some examples, the top length 210 is the same as the base length 211.

Figure 4A:
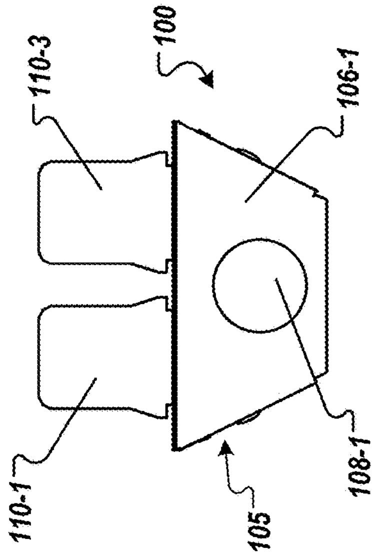
FIG. 4A is a rear view of the example lighting fixture assembly of FIG. 1A with holders extended.
Figure 4B:
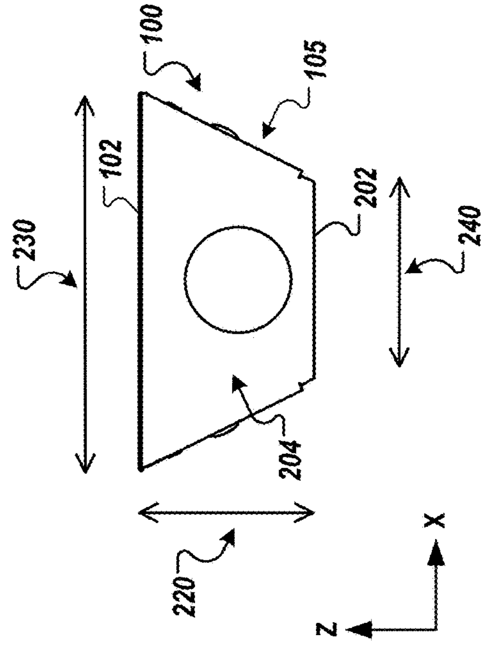
FIG. 4B is a rear view of the example lighting fixture assembly of FIG. 1A with holders retracted.

Referring to FIG. 4B, base plate has a base width 240 in the x-direction and the top plate 102 has a top width 230 in the x-direction. The top width 230 is greater than the base width 240. In some examples, the top width 230 corresponds to a sum of tube light diameters 150 of the number of tube lights that the assembly 100 is configured to hold. For example, the top width 230 of the top plate 102 of the assembly 100 can correspond to a sum of two tube light diameters 150, since the assembly 100 is configured to hold two tube lights. In some examples, a ratio between the top width 230 and the sum of the tube light diameters 150 is 1.5 or less.

The sidewalls 104-1, 104-2 and end walls 106-1, 106-2 of the housing 105 are attached to and extend from the base plate 202. As can be seen in FIGS. 2, 3A, and 3B, the sidewalls 104-1, 104-2 extend along the base length 211. Referring to FIG. 3A, in some examples, the end walls 106-1, 106-2 each includes a flange 206-1, 206-2 (referred herein collectively as "flanges 206"). The flange 206 overlaps with the sidewalls 104. When the top plate 102 is positioned over and aligned with the housing 105, an aperture 146-1, 146-2, 146-3, 146-4 through each flange 206-1, 206-2 overlaps with an aperture 148-1, 148-2, 148-3, 148-4 of the respective sidewall 104-1, 104-2. The end wall 106 can thus be affixed to the sidewall 104 with a fastener inserted through the apertures.

As previously discussed, the holders 110 can be extended from and retracted into the housing 105 of the light fixture assembly 100. FIG. 4A and FIG. 5A depict the holders 110 extended from the housing, and FIGS. 4B and 5B depicts the holders 110 retracted within the housing 105. As can be seen in FIGS. 4A and 5A, each end wall 106-1, 106-2 defines an opening 108-1, 108-2. The opening 108-1, 108-2 through each end wall 106-1, 106-2 enables access to an inside portion of the holders 110, which enables a user to extend the holders 110 outside of the housing 105 (for example, during installation of the light fixture assembly 100). In some examples, the holders 110 can fold down to be flush with the top plate 102 instead of, or in addition to, being extractable and retractable from the housing 105.

Referring to FIG. 4B, the distance between the top plate 102 and the base plate 202 when the top plate 102 is attached to the housing corresponds to a depth 220 of a trough 204 defined by the housing 105. In some examples, the depth 220 of the trough 204 defined by the housing 105 corresponds to the tube light diameter 150. In some examples, a ratio between the depth 220 of the trough 204 and the tube light diameter is 1.5 or less.

Figure 4C:
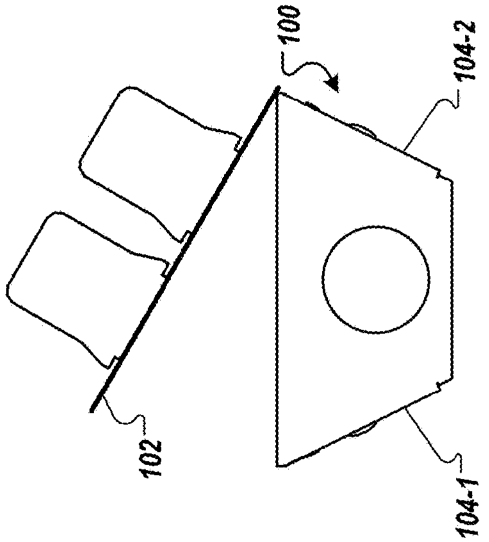
FIG. 4C is a rear view of the example lighting fixture assembly of FIG. 1A with the top plate detached from the left sidewall.
Figure 4D:
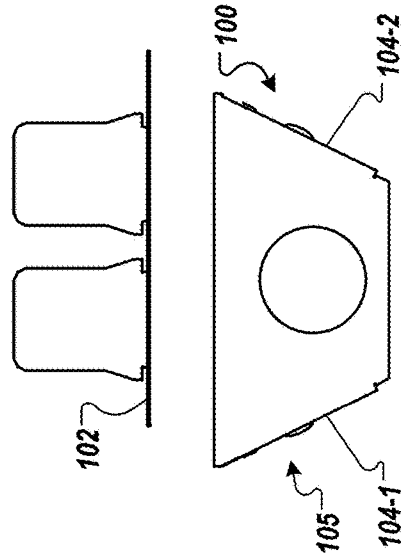
FIG. 4D is a rear view of the example lighting fixture assembly of FIG. 1A with the top plate detached from the housing.

As previously discussed, the top plate 102 is configured to releasably couple to the housing (e.g., using fasteners 120). FIG. 6A depicts the example lighting fixture assembly 100 with the top plate attached to the housing, and FIGS. 4D and 5D depict the example lighting fixture assembly 100 with the top plate 102 detached from the housing 105. The top plate 102 can be attachable to the left sidewall 104-2 and to the right sidewall 104-1 by connectors 120, such as latches and lance bridge connectors. In some examples, the connectors 120 include a combination of latches and lance bridge connectors. In some examples, the connectors 120 include only latches. In some examples, the connectors 120 include only bridge lance connectors. The top plate 102 can be removed from the housing 105 by manually disengaging the connectors 120.

In some examples, the top plate 102 is attached to the housing 105 though a hinge connection to enable easy access to the trough 204, for example, to remove light bulbs from the trough 204. FIGS. 4C and 5C depict the example lighting fixture assembly 100 with the top plate 102 attached to the left sidewall 104-2 of the housing 105 by one or more hinges and the top plate 102 detached from the right sidewall 104-1 of the housing. In some implementations, the top plate 102 can be attachable to the right sidewall 104-1 by one or more latches. The top plate 102 can be detached from the right sidewall 104-1 by disengaging the latches. In some implementations, the top plate 102 can be attachable to the right sidewall 104-1 by one or more bridge lance connectors. The top plate 102 can be detached from the right sidewall 104-1 by disengaging the bridge lance connectors.

FIG. 5E is a cross-sectional front view of the example lighting fixture assembly 100 with two tube lights 130-1, 130-2 contained in the trough 204 of the housing 105. The trough 204 has a trapezoidal prism shape. As can be seen in FIG. 5E, the housing 105 is devoid of a reflector, electrical ballast, a backup battery, and an external driver. In some implementations, the trough 204 of the housing 105 is configured to house one or more LED components, such as emergency backup components for LED lights.

As previously discussed, tube lights 130 to be installed in the light fixture assembly 100 can be contained within the trough 204 defined by the housing 105 of the light fixture assembly, for example, during storage or shipping of the light fixture assembly 100. FIG. 6B depicts the example lighting fixture assembly 100 with the top plate detached from the housing and two tube lights 130-1, 130-2 contained in the trough 204 of the housing. As can be seen in FIG. 6B, the two tube lights 130-1, 130-2 are completely contained within the housing 105 of the light fixture assembly 100.

Figure 43:
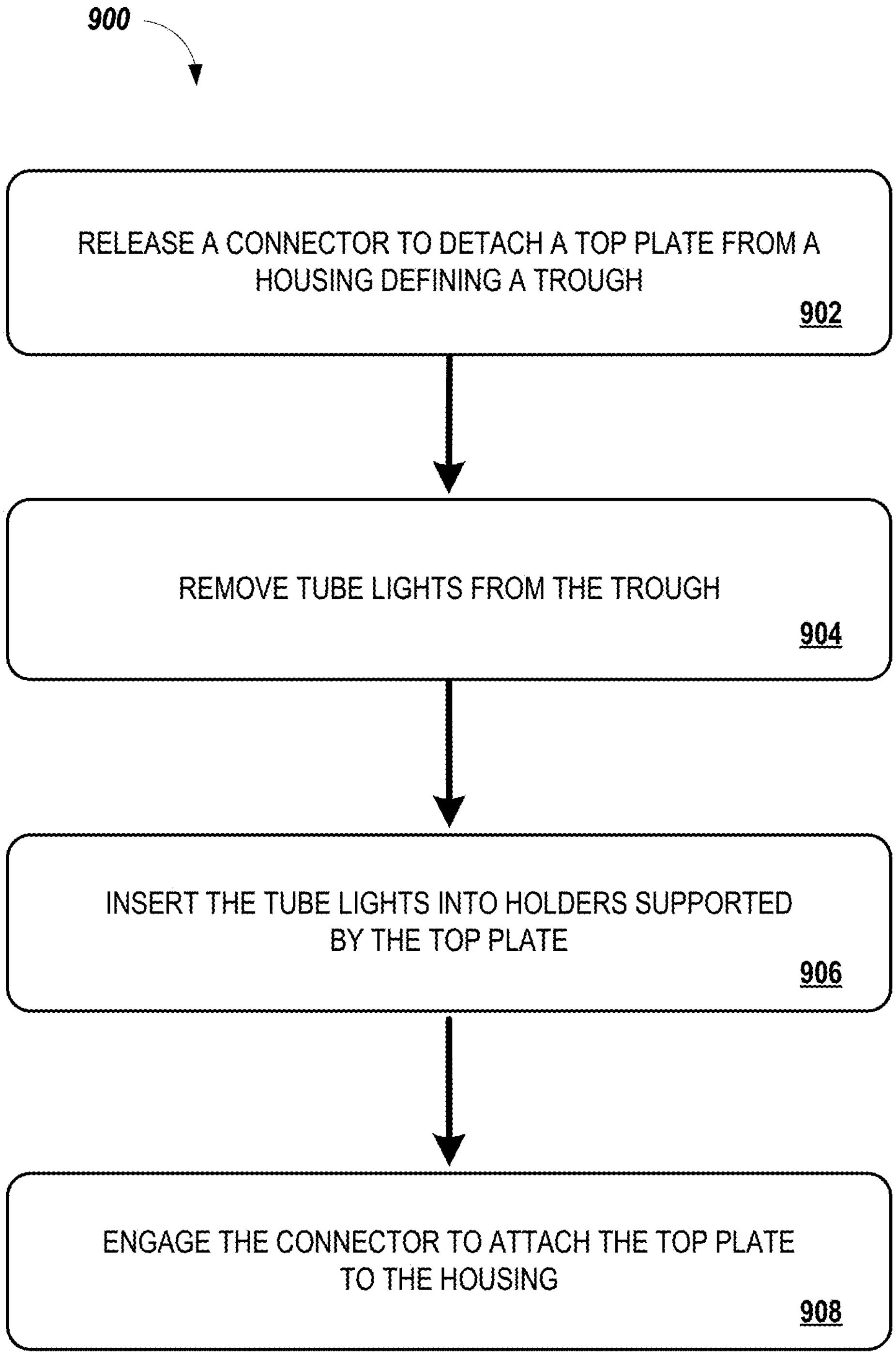
FIG. 43 is a flow diagram of an example process of assembly for a lighting fixture.

FIG. 43 is a flow diagram of an example process 900 of assembly for a lighting fixture.

The process 900 includes releasing a connector to detach a top plate of a light fixture assembly from a housing of the light fixture assembly defining a trough (902). For example, the housing 105 defines a trough 204 that is sized to contain the number of tube lights 130 that the assembly 100 is configured to hold with holders 110. The top plate 102 supports the holders 110 for the tube lights 130. The connectors 120-1, 120-2 can be released to detach the top plate 102 from a sidewall 104-2 of the housing 105. In some examples, connectors can be released to detach the top plate 102 from both sidewalls 104-2, 104-1 of the housing 105.

The process 900 includes removing tube lights from the trough (904). For example, the tube lights 130-1, 130-2 can be removed from the trough 204 defined by the housing 105. In some examples, the process 900 also includes extracting the holders 110 from the housing 105. Extracting the holders 110 from the housing 105 can include raising the holders 110 through the openings 111 in the top plate 102 to an extended position above the housing 105. The tube lights can be removed from the trough 204 by hand, without the use of a tool, and without disassembling the lighting fixture assembly.

The process 900 includes inserting the tube lights into the respective holders 110 (906). For example, a first end of the tube light 130-1 can be inserted into the holder 110-1, and a second end of the tube light 130-1 can be inserted into the holder 110-2. A first end of the tube light 130-2 can be inserted into the holder 110-3, and a second end of the tube light 130-2 can be inserted into the holder 110-4.

The process 900 includes engaging one or more connectors of the light fixture assembly to attach the top plate to the housing (908). For example, the connectors 120 can be engaged to attach the top plate 102 to the housing 105. The top plate 102 and the housing 105 enclose the trough 204 when the top plate 102 is attached to the housing 105.

Figure 44:
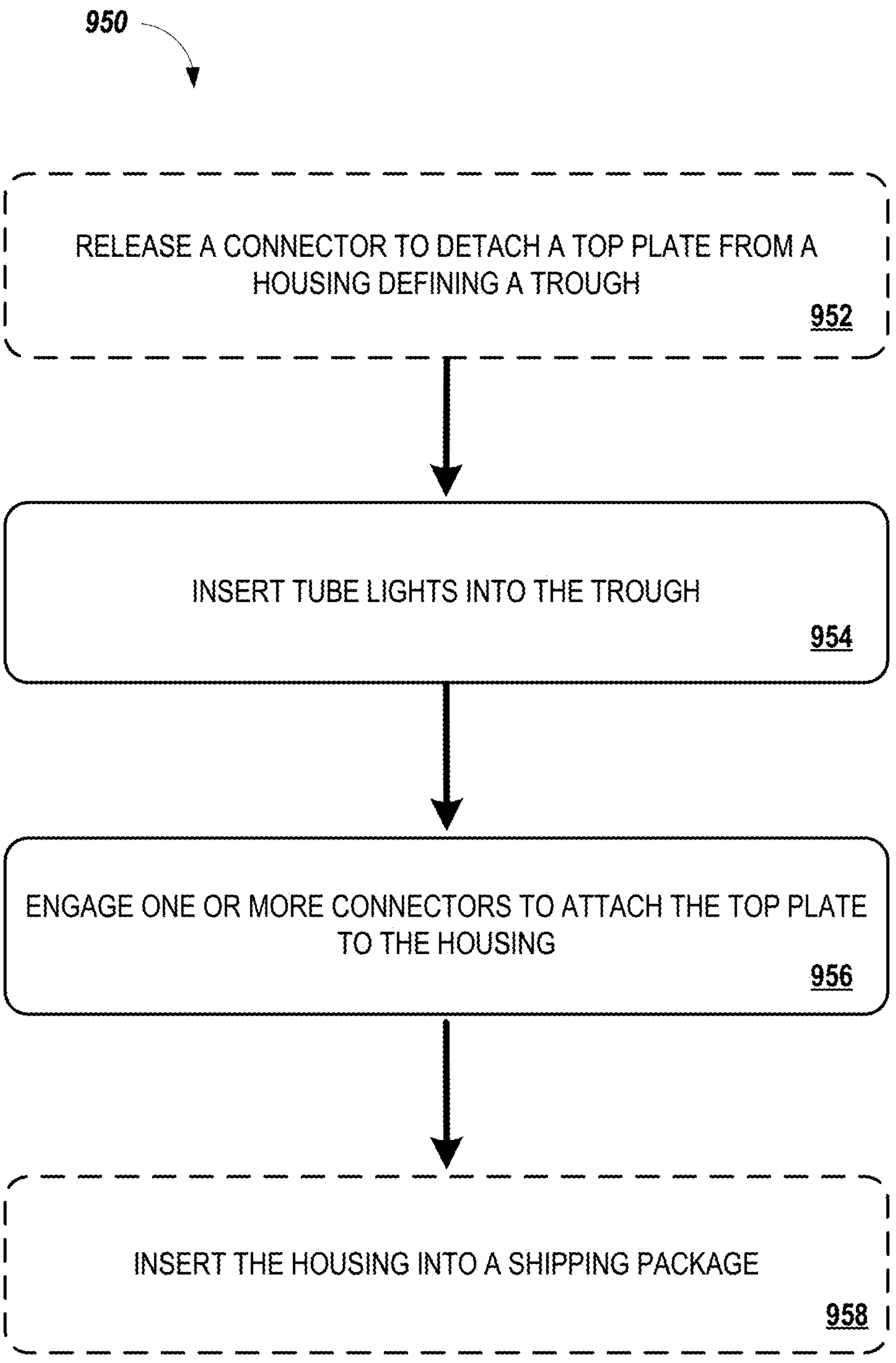
FIG. 44 is a flow diagram of an example process of preparing a lighting fixture for shipping.

FIG. 44 is a flow diagram of an example process 950 of preparing a lighting fixture for shipping or storage.

If the light fixture has been previously assembled, the process 950 can include releasing a connector to detach a top plate of the light fixture assembly from a housing of the light fixture assembly defining a trough (952). For example, the housing 105 defines a trough 204 that is sized to contain the number of tube lights 130 that the assembly 100 is configured to hold with holders 110. The top plate 102 supports the holders 110 for the tube lights 130. The connectors 120-1, 120-2 can be released to detach the top plate 102 from a sidewall 104-2 of the housing 105. In some examples, connectors can be released to detach the top plate 102 from both sidewalls 104-2, 104-1 of the housing 105.

The process 950 includes inserting tube lights into the trough (954). For example, the tube lights 130-1, 130-2 can be inserted into the trough 204 defined by the housing 105. In some examples, the process 900 includes retracting the holders 110 into the housing 105. Retracting the holders 110 into the housing 105 can include lowering the holders 110 through the openings 111 in the top plate 102. The tube lights can be inserted into the trough 204 by hand, without the use of a tool, and without disassembling the lighting fixture assembly.

The process 950 includes engaging one or more connectors of the light fixture assembly to attach the top plate of the light fixture assembly to the housing (956). For example, the connectors 120 can be engaged to attach the top plate 102 to the housing 105. The top plate 102 and the housing 105 enclose the trough 204, containing the tube lights 130-1, 130-2, when the top plate 102 is attached to the housing 105.

In some implementations, the process 950 includes inserting the housing into a shipping package once the tube lights are contained within the housing and the top plate is secured to the housing (958). The housing 105 is protective of the tube lights 130 during shipping and storing when the tube lights are contained in the trough 204. In some examples, the process 950 includes stacking the lighting fixture with one or more other lighting fixtures inside the shipping package. The lighting fixture can be stacked with other lighting fixtures of the same size, and with lighting fixtures of different sizes. For example, a lighting fixture configured to hold six tube lights can be stacked with a lighting fixture configured to hold eight tube lights. The housings protect the tube lights from damage when stacked with the tube lights contained in the respective troughs.

While certain embodiments have been described, other embodiments are possible.

For example, while the light fixture assembly 100 has been depicted as being configured to hold two tube lights, light fixture assemblies can be provided to hold other numbers for tube lights (e.g., 1, 3, 4, 5, etc.). FIGS. 8-42 show various views of lighting fixture assemblies configured to hold other quantities of tube lights. For example, FIGS. 8-14 show an example lighting fixture assembly 300 configured to hold three tube lights. FIGS. 15-21 depict an example lighting fixture assembly 400 configured to hold four tube lights. FIGS. 22-28 depict an example lighting fixture assembly 600 configured to hold five tube lights. FIGS. 29-35 show an example lighting fixture assembly 700 configured to hold seven tube lights. FIGS. 36-42 show an example lighting fixture assembly 800 configured to hold eight tube lights.

In addition, while the light fixture assembly 100 has been described as being without a diffuser, lens, cover, or shade, in some implementation the light fixture assembly can include a diffuser, lens, cover, or shade to cover the light bulbs coupled to the light fixture assembly. Further, while the light fixture assembly 100 has been described as being devoid of an external driver, in some implementation the light fixture assembly 100 includes a driver.

Embodiments of the subject matter and the operations described in this specification can be implemented, in party, by digital electronic circuitry, or in computer software, firmware, or hardware, including the structures disclosed in this specification and their structural equivalents, or in combinations of one or more of them, in additional to the structures described above.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Other embodiments are in the following claims.

What is claimed is:

1. A lighting fixture assembly comprising:

a plurality of tube lights;

a top plate supporting holders for the plurality of tube lights, wherein, when the lighting fixture assembly is in a first configuration, each holder supports a tube light of the plurality of tube lights and is configured to provide an electrical connection to the tube light of the plurality of tube lights; and a housing defining a trough that is sized to contain the plurality of tube lights, the top plate being configured for releasable attachment to the housing, and the top plate and the housing enclosing the trough when the top plate is attached to the housing, wherein, when the lighting fixture assembly is in a second configuration, the plurality of tube lights are contained within the trough, and wherein, when the lighting fixture assembly is in the first configuration, the plurality of tube lights are external to the trough.

2. The lighting fixture assembly of claim 1, wherein the tube light of the plurality of tube lights has a tube light length, the housing comprising:

a base plate having a base length in a first direction, the base length corresponding to the tube light length;

a pair of opposing sidewalls attached to the base plate and extending along the base length; and a pair of opposing end walls attached to the base plate and each connecting the pair of sidewalls.

3. The lighting fixture assembly of claim 2, wherein:

the top plate is configured for releasable attachment to the pair of sidewalls, the top plate has a top length corresponding to the tube light length, a ratio between the base length and the tube light length is 1.1 or less, the base plate has a base width in a second direction orthogonal to the first direction; and the top plate has a top width in the second direction, the top width being greater than the base width.

4. The lighting fixture assembly of claim 3, wherein:

each tube light of the plurality of tube lights has a respective tube light diameter; and the top width corresponds to a sum of tube light diameters of the plurality of tube lights, wherein a ratio between the top width and the sum of the tube light diameters is 1.5 or less.

5. The lighting fixture assembly of claim 2, wherein the base plate is ceiling mountable.

6. The lighting fixture assembly of claim 1, wherein:

a tube light of the plurality of tube lights has a tube light diameter; and a depth of the trough corresponds to the tube light diameter, wherein a ratio between the depth of the trough and the tube light diameter is 1.5 or less.

7. The lighting fixture assembly of claim 1, wherein the plurality of tube lights are uniform in tube light diameter and tube light length.

8. The lighting fixture assembly of claim 1, wherein the trough has a trapezoidal prism shape.

9. The lighting fixture assembly of claim 1, wherein the top plate comprises openings through which the holders can be raised or lowered, wherein, when the top plate is attached to the housing, the holders are retractable into the housing through the openings.

10. The lighting fixture assembly of claim 1, wherein the holders comprise, for each of the plurality of tube lights, a first holder configured to receive a first end of the tube light, and a second holder configured to receive a second end of the tube light.

11. The lighting fixture assembly of claim 1, wherein the housing is devoid of:

a reflector, electrical ballast, and a backup battery.

12. The lighting fixture assembly of claim 1, wherein the plurality of tube lights comprises two tube lights, three tube lights, four tube lights, five tube lights, six tube lights, seven tube lights, or eight tube lights.

13. The lighting fixture assembly of claim 1, wherein the top plate is releasably attachable to the housing without using tools.

14. A method of assembly for a lighting fixture, comprising:

releasing a connector to detach a top plate from a housing, the housing defining a trough that is sized to contain a plurality of tube lights, the top plate supporting holders for the plurality of tube lights;

removing the plurality of tube lights from the trough;

inserting the plurality of tube lights into the respective holders; and engaging the connector to attach the top plate to the housing, wherein the top plate and the housing enclose the trough when the top plate is attached to the housing.

15. The method of claim 14, wherein: the holders are retractable into the housing when the top plate is attached to the housing, the method comprising extending the holders outside the housing before inserting the plurality of tube lights into the holders.

16. The method of claim 15, wherein:

the top plate comprises openings through which the holders can be raised or lowered; and extending the holders outside the housing comprises raising the holders through the openings, wherein each holder is configured to provide an electrical connection to a respective tube light of the plurality of tube lights.

17. The method of claim 14, further comprising:

removing a plurality of tube lights from the respective holders;

releasing the connector to detach the top plate from the housing;

inserting the plurality of tube lights into the trough; and engaging the connector to attach the top plate to the housing.

18. A lighting fixture assembly comprising:

a top plate supporting holders for a plurality of tube lights, wherein each holder is configured to provide an electrical connection to a respective tube light of the plurality of tube lights; and a housing defining a trough that is sized to contain the plurality of tube lights, the housing being devoid of electrical ballast, the top plate being configured for releasable attachment to the housing without using tools, and the top plate and the housing enclosing the trough when the top plate is attached to the housing, wherein each holder is configured to support the respective tube light such that the tube light is external to the trough.

* * * * *